US011736447B2

(12) United States Patent
Patel et al.

(10) Patent No.: US 11,736,447 B2
(45) Date of Patent: Aug. 22, 2023

(54) METHOD AND SYSTEM FOR OPTIMIZING ACCESS TO DATA NODES OF A DATA CLUSTER USING A DATA ACCESS GATEWAY AND METADATA MAPPING BASED BIDDING IN AN ACCELERATOR POOL

(71) Applicant: Dell Products L.P., Hopkinton, MA (US)

(72) Inventors: Dharmesh M. Patel, Round Rock, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 299 days.

(21) Appl. No.: 16/936,469

(22) Filed: Jul. 23, 2020

(65) Prior Publication Data

US 2022/0029955 A1  Jan. 27, 2022

(51) Int. Cl.
*H04L 29/00* (2006.01)
*H04L 9/40* (2022.01)
*G06F 9/50* (2006.01)

(52) U.S. Cl.
CPC .......... *H04L 63/029* (2013.01); *G06F 9/5083* (2013.01)

(58) Field of Classification Search
CPC ............................ H04L 63/029; G06F 9/5083
USPC .......................................................... 726/12
See application file for complete search history.

(56) References Cited

U.S. PATENT DOCUMENTS

| 6,151,688 | A | 11/2000 | Wipfel et al. |
| 7,184,421 | B1 | 2/2007 | Liu et al. |
| 8,059,599 | B1 | 11/2011 | Rogers et al. |
| 8,640,137 | B1 | 1/2014 | Bostic et al. |
| 9,621,643 | B1 | 4/2017 | Emelyanov |
| 10,015,106 | B1 | 7/2018 | Florissi et al. |
| 2003/0182264 | A1 | 9/2003 | Wilding et al. |
| 2004/0153866 | A1 | 8/2004 | Guimbellot et al. |
| 2007/0156733 | A1 | 7/2007 | Meyerson |
| 2008/0256018 | A1 | 10/2008 | Chaudhury et al. |
| 2011/0208737 | A1 | 8/2011 | Shmueli et al. |
| 2011/0258161 | A1 | 10/2011 | Constantinescu et al. |
| 2012/0059934 | A1 | 3/2012 | Rafiq et al. |
| 2012/0254175 | A1 | 10/2012 | Horowitz et al. |
| 2013/0297770 | A1 | 11/2013 | Zhang |
| 2016/0048415 | A1 | 2/2016 | Sarma et al. |

(Continued)

*Primary Examiner* — Brandon Hoffman
*Assistant Examiner* — Michael D Anderson
(74) *Attorney, Agent, or Firm* — Chamberlain, Hrdlicka, White, Williams & Aughtry

(57) ABSTRACT

A method that is performed to access data nodes of a data cluster. The method includes obtaining, by a data access gateway (DAG), a first request from a host; and in response to the first request, obtaining first bidding counters from the data nodes; obtaining first metadata mappings from the data nodes; making a first determination that the first request may not be served using any data node in an accelerator pool of the data cluster; and in response to the first determination, identifying, based on the bidding counters and metadata mappings, a data node in a non-accelerator pool of the data cluster associated with a first highest bidding counter of the bidding counters and a first appropriate metadata mapping of the metadata mappings; and sending the first request to the data node in the non-accelerator pool of the data cluster.

17 Claims, 21 Drawing Sheets

(56) References Cited

U.S. PATENT DOCUMENTS

| | | | |
|---|---|---|---|
| 2017/0093681 A1* | 3/2017 | Chaubey | H04L 41/0806 |
| 2017/0289316 A1 | 10/2017 | Solis | |
| 2018/0004622 A1* | 1/2018 | Brandt | G06F 9/4812 |
| 2021/0240540 A1 | 8/2021 | Wang et al. | |

* cited by examiner

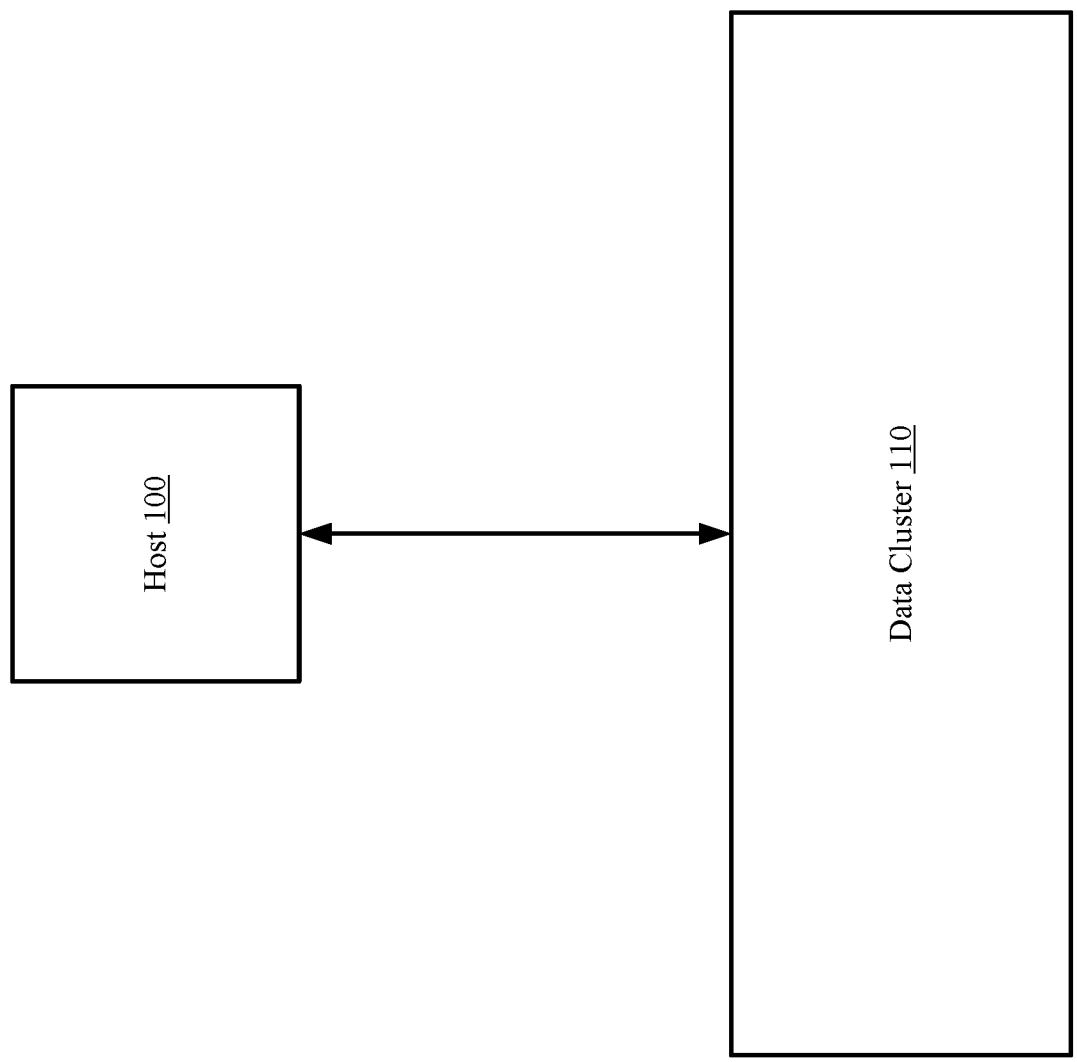

US 11,736,447 B2

METHOD AND SYSTEM FOR OPTIMIZING ACCESS TO DATA NODES OF A DATA CLUSTER USING A DATA ACCESS GATEWAY AND METADATA MAPPING BASED BIDDING IN AN ACCELERATOR POOL

BACKGROUND

Devices may generate information based on existing information. For example, devices may obtain information and derive information based on the obtained information. To obtain information, devices may be able to communicate with other devices. The communications between devices may be through any means.

SUMMARY

In general, in one aspect, the invention relates to a method performed to access data nodes of a data cluster. The method includes obtaining, by a data access gateway (DAG), a first request from a host; and in response to the first request, obtaining first bidding counters from the data nodes; obtaining first metadata mappings from the data nodes; making a first determination that the first request may not be served using any data node in an accelerator pool of the data cluster; and in response to the first determination, identifying, based on the bidding counters and metadata mappings, a data node in a non-accelerator pool of the data cluster associated with a first highest bidding counter of the bidding counters and a first appropriate metadata mapping of the metadata mappings; and sending the first request to the data node in the non-accelerator pool of the data cluster.

In general, in one aspect, the invention relates to a system that is used to access data nodes of a data cluster. The system includes a processor; and a data access gateway (DAG), which when executed by the processor preforms a method. The method includes obtaining, by the DAG, a first request from a host; and in response to the first request, obtaining first bidding counters from the data nodes; obtaining first metadata mappings from the data nodes; making a first determination that the first request may not be served using any data node in an accelerator pool of the data cluster; and in response to the first determination, identifying, based on the bidding counters and metadata mappings, a data node in a non-accelerator pool of the data cluster associated with a first highest bidding counter of the bidding counters and a first appropriate metadata mapping of the metadata mappings; and sending the first request to the data node in the non-accelerator pool of the data cluster.

In general, in one aspect, the invention relates to a non-transitory computer readable medium which includes computer readable program code, which when executed by a computer processor enables the computer processor to perform a method for access data nodes of a data cluster. The method includes obtaining, by a data access gateway (DAG), a first request from a host; and in response to the first request, obtaining first bidding counters from the data nodes; obtaining first metadata mappings from the data nodes; making a first determination that the first request may not be served using any data node in an accelerator pool of the data cluster; and in response to the first determination, identifying, based on the bidding counters and metadata mappings, a data node in a non-accelerator pool of the data cluster associated with a first highest bidding counter of the bidding counters and a first appropriate metadata mapping of the metadata mappings; and sending the first request to the data node in the non-accelerator pool of the data cluster.

BRIEF DESCRIPTION OF DRAWINGS

FIG. 1A shows a diagram of a system in accordance with one or more embodiments of the invention.

DETAILED DESCRIPTION

Figure 1B:
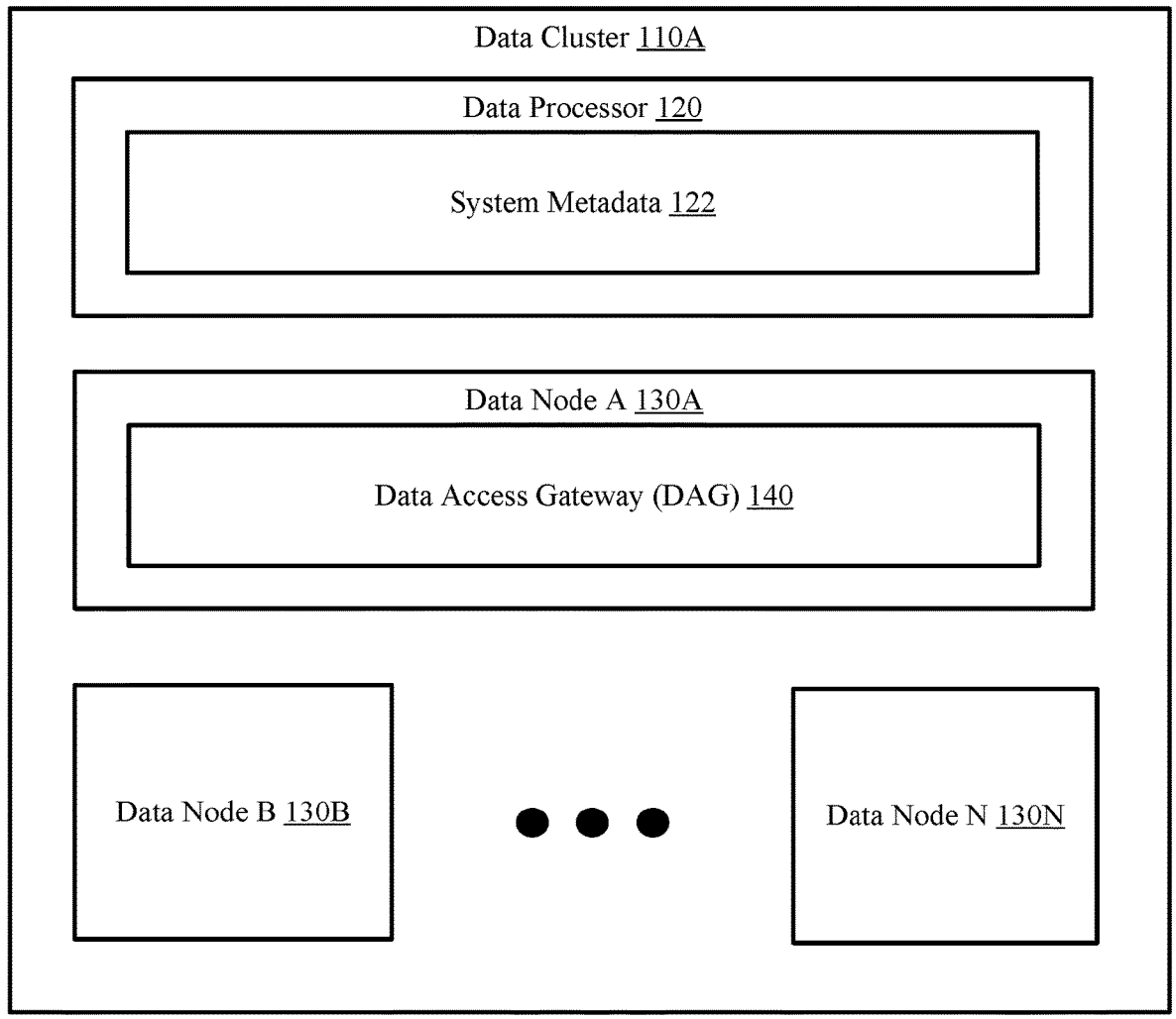
FIG. 1B shows a diagram of a data cluster without an accelerator pool in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for access data in a data cluster. More specifically, embodiments of the invention relate to identifying data nodes of a system that are available to service requests through data access gateway (DAG) operations (see e.g., FIG. 3E). The DAG operations may include identifying, based on obtained bidding counters and metadata mappings that specify the amount of computational resources available to the data nodes and the data stored in the data nodes of the data cluster respectively, available data nodes that include the required data to service requests, determining whether the data nodes are in an accelerator pool of the data cluster as data nodes within the accelerator pool include higher computational capabilities than those in a non-accelerator pool, and selecting the identified data nodes associated with the highest bidding counter to service the requests. The DAG operations and the use of bidding counters and metadata mappings may be used to improve the computational efficiency of accessing data stored in a data cluster.

FIG. 1A shows a diagram of a system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention. In utilizing the data cluster (110), the host (100) may also access data stored in the data cluster (110). The host (100) may send requests to the data cluster (110) to access data within the data cluster (110). The requests may include write requests, read requests, update requests, information requests, and deletion requests. The requests may include other and/or additional requests without departing from the invention.

A read request may refer to a request sent by the host (100) to the data cluster (110) to access data stored in the data cluster (110). An update request may refer to a request sent by the host (100) to the data cluster (110) to update and/or modify data stored in the data cluster (110). A write request may refer to a request sent by the host (100) to the data cluster (110) to write and/or store data in the data cluster (110). An information request may refer to a request sent by the host (100) to the data manager (110) to obtain metadata associated with data stored in the data cluster (110). A deletion request may refer to a request sent by the host (100) to the data cluster (110) to delete data stored in the data cluster (110). The aforementioned requests may refer to other and/or additional types of requests sent by the host (100) to the data cluster (110) that are associated with data stored on the data cluster (110) or data to be written to the data cluster (110) without departing from the invention.

Figure 5:
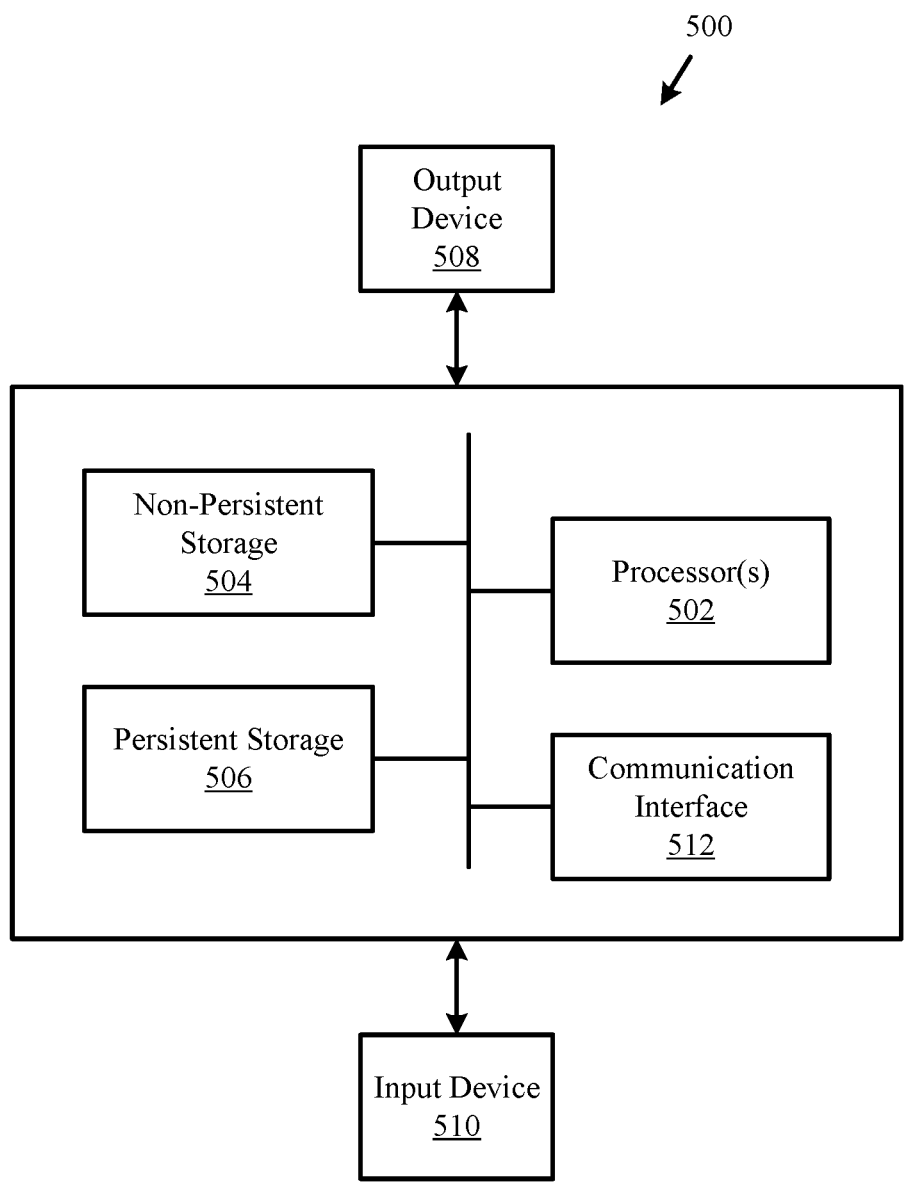
FIG. 5 shows a diagram of a computing device in accordance with one or more embodiments of the invention.

Continuing with the discussion of FIG. 1A, in one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the deduplicated data across data nodes operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one or more embodiments of the invention, an erasure coding procedure includes dividing the obtained data into portions, referred to as data chunks. Each data chunk may include any number of data segments associated with the obtained data. The individual data chunks may then be combined (or otherwise grouped) into data slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. The chunks of a data slice may then be stored across different data nodes in a data cluster. Any chunk within a data slice may be reconstructed using the other chunks in the data slice. Non-limiting examples of erasure coding algorithms are RAID-3, RAID-4, RAID-5, and RAID-6. Other erasing coding algorithms may be used without departing from the invention.

Continuing with the discussion of FIG. 1A, the data cluster (110) may include persistent storage devices found within data nodes that each store any number of portions of data. The portions of data may be obtained by other persistent storage devices, data nodes, data nodes, or from the host (100). For additional details regarding the data cluster (110), see, e.g., FIG. 1B.

FIG. 1B shows a diagram of a data cluster without an accelerator pool in accordance with one or more embodiments of the invention. The data cluster (110A) may be an embodiment of the data cluster (110, FIG. 1A) discussed above. The data cluster (110A) may include a data processor (120) and any number of data nodes (130A, 130B, 130N). The components of the data cluster (110A) may be operably connected via any combination of wired and/or wireless connections. Each of the aforementioned components is discussed below.

In one or more embodiments of the invention, the data processor (120) is a device (physical or logical) that includes the functionality to determine whether to perform various DAG operations and, if so, where in the data cluster to perform the DAG operations. The DAG operations may include using discovery operations, bidding counter operations, and metadata mapping operations to select a data node e.g., (130A) to service a request. Additionally, in one or more embodiments of the invention, the data processor (120) obtains system metadata (122) (discussed below) and uses the system metadata (122) to determine where to perform the DAG operations. The data processor (120) may determine where to perform DAG operations via the method illustrated in FIG. 3F.

Figure 3A:
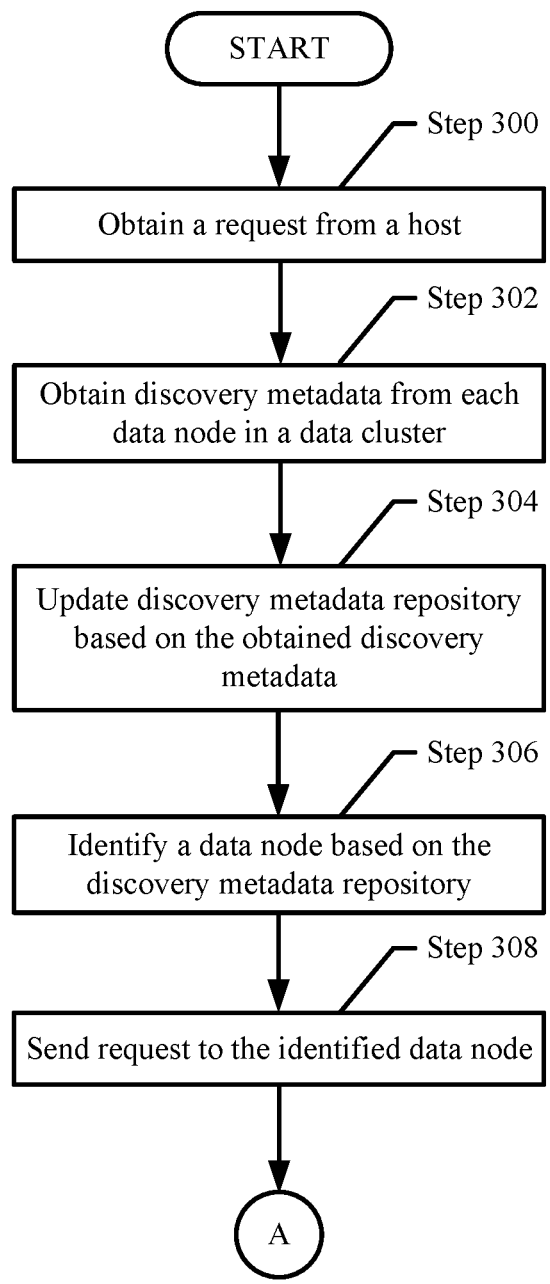
FIGS. 3A-3B show flowcharts of a method for performing data access gateway operations in accordance with one or more embodiments of the invention.
Figure 3B:
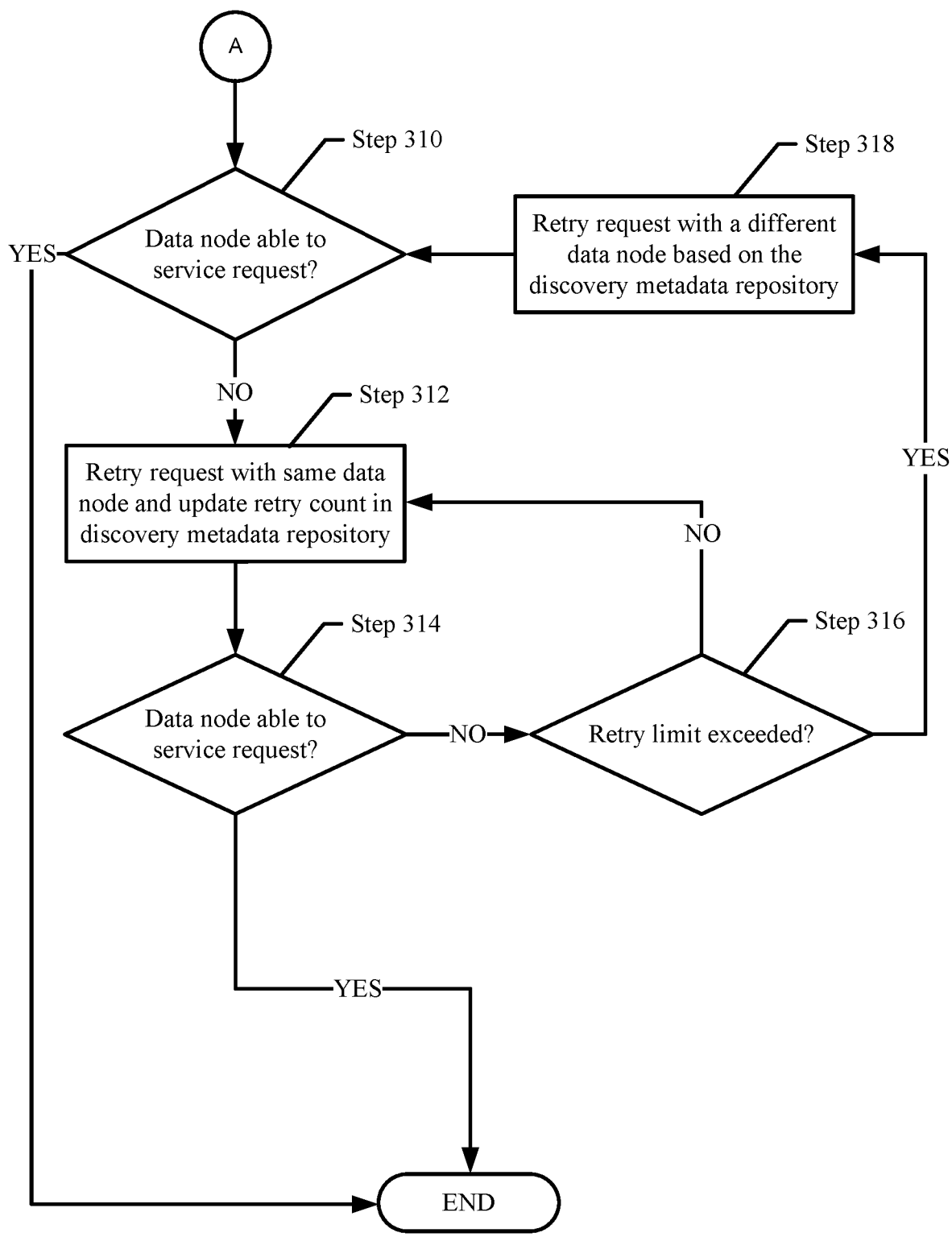
Figure 3C:
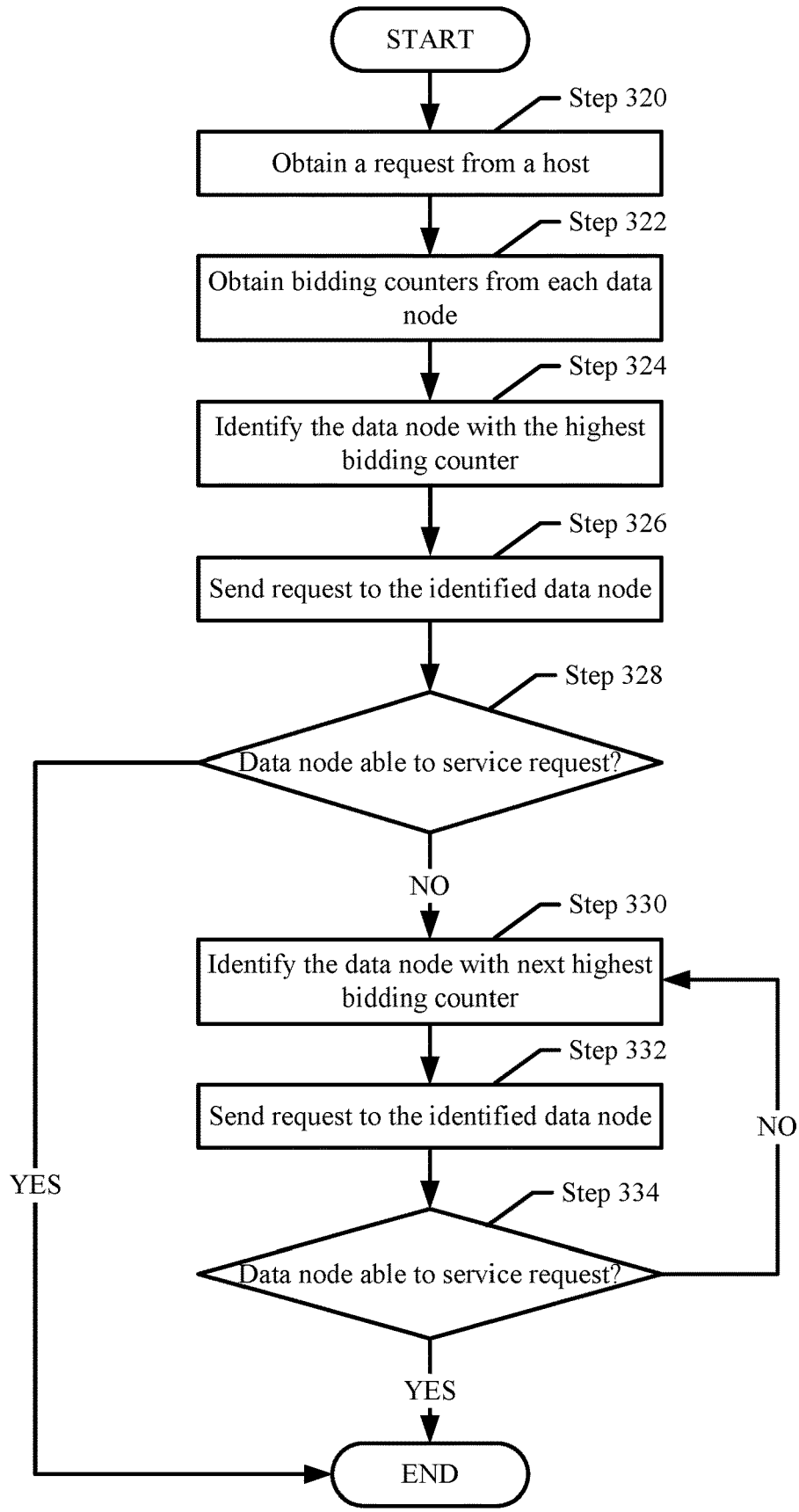
FIG. 3C shows a flowchart of a method for performing data access gateway operations with bidding counters in accordance with one or more embodiments of the invention.
Figure 3D:
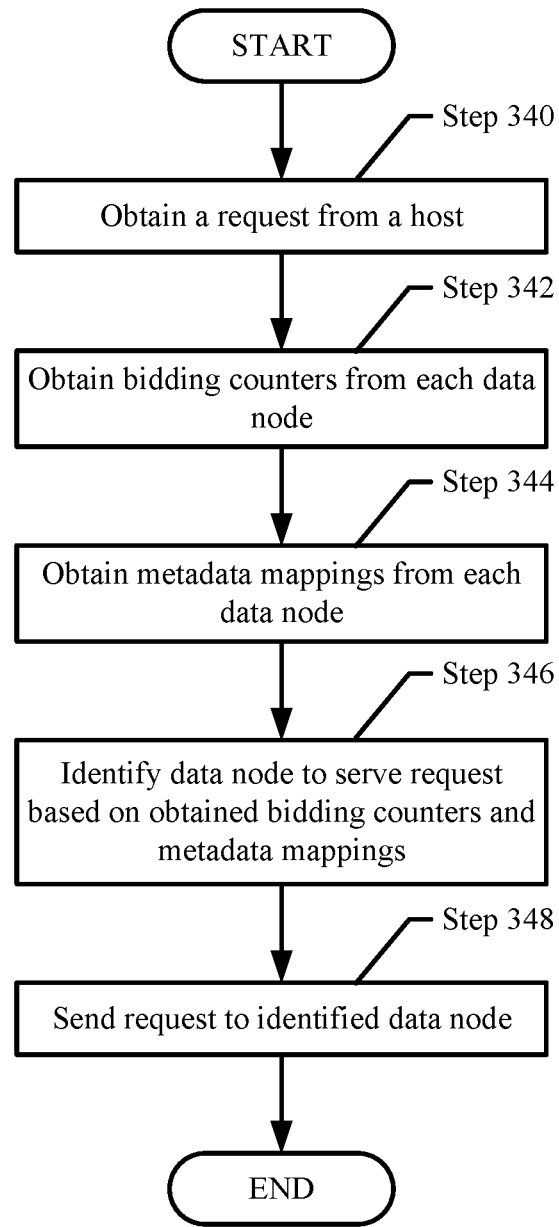
FIG. 3D shows a flowchart of a method for performing data access gateway operation with bidding counters and metadata mappings in accordance with one or more embodiments of the invention.
Figure 3E:
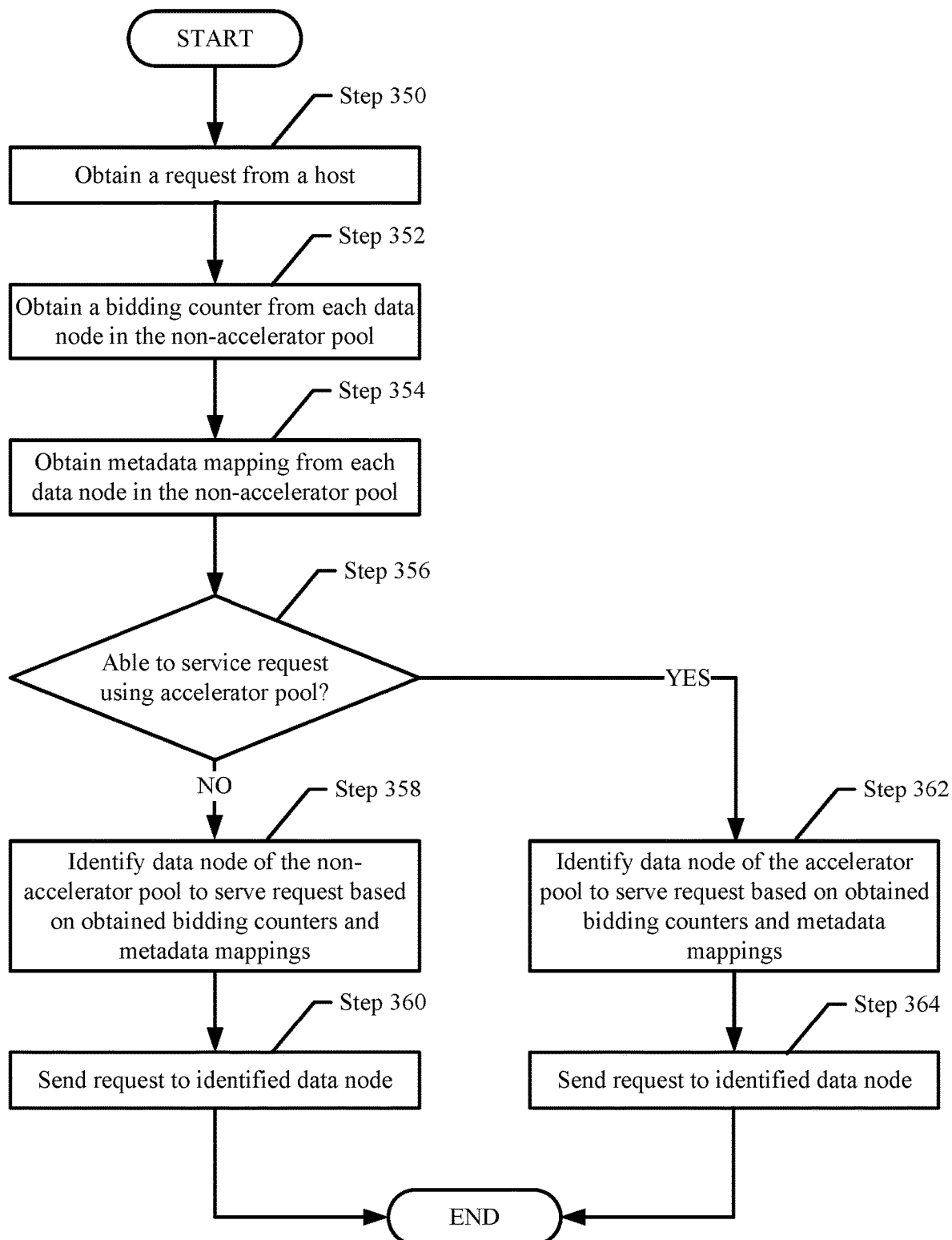
FIG. 3E shows a flowchart of a method for performing data access gateway operations in a data cluster that includes an accelerator pool in accordance with one or more embodiments of the invention.
Figure 3F:
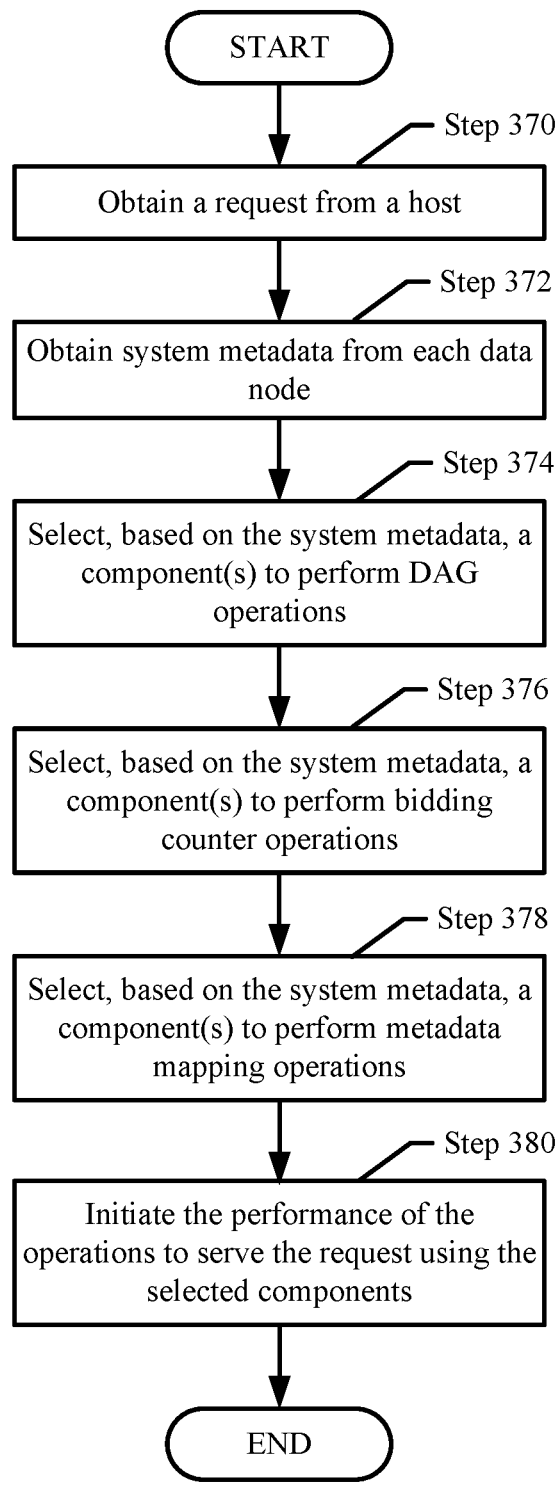
FIG. 3F shows a flowchart of a method for determining where in a data cluster to implement data access gateway operations in accordance with one or more embodiments of the invention.

In one or embodiments of the invention, the data processor (120) is implemented as computer instructions, e.g., computer code, stored on a persistent storage device of a data node (e.g., 130A, 130B, 130N) that when executed by a processor of a data node (e.g., 130A, 130B, 130N) cause the data node (e.g., 130A, 130B, 130N) to provide the aforementioned functionality of the data processor (120) described throughout this application and/or all, or a portion thereof, of the method illustrated in FIG. 3F.

In one or more embodiments of the invention, the data processor (120) is implemented as a computing device (see e.g., FIG. 5), is operatively connected to (but separate from) the data nodes (e.g., 130A, 130B, 130N) in the data cluster. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (120) described throughout this application and/or all, or a portion thereof, of the methods illustrated in FIG. 3F.

In one or more embodiments of the invention, the data processor (120) is implemented as a logical device. The logical device may utilize the computing resources of any number of computing devices and thereby provide the functionality of the data processor (120) described throughout this application and/or all, or a portion thereof, of the methods illustrated in FIG. 3F.

In one or more embodiments of the invention, system metadata (122) may be one or more data structures that may include metadata associated with and obtained from each component of the data cluster (110A), not including the data processor (120). The system metadata may include computational capability information and prior performance information for each component of the data cluster. The system metadata (122) may include other and/or additional information regarding each component in the data cluster (110A) without departing from the invention. The computational capability information and prior performance information are discussed below.

The computational capability information may indicate whether the host has the necessary computational resources to perform various DAG operations. The computational capability information may include, for example, the underlying hardware of each component of the data cluster (110A) and the processing capabilities of the underlying hardware. The computational capability information may include other and/or additional information that indicates whether a component of the data cluster (110A) is able to perform various DAG operations without departing from the invention.

The prior performance information may include information regarding past DAG operations and requests performed by the components of the data cluster (110A). The prior performance information may include, for example, latency, throughput, and computational overhead associated with previous DAG operations and requests. The prior performance information may include other and/or additional information associated with the performance of prior operations without departing from the invention.

In one or more embodiments of the invention, the data nodes (130A, 130B, 130N) store data chunks and/or parity chunks. The data nodes (130A, 130B, 130N) may include persistent storage that may be used to store the data chunks and parity chunks. The data nodes (130A, 130B, 130N) may also service requests for the host (100). The data nodes (130A, 130B, 130N) may also include the functionality to generate and provide to the DAG (140) discovery metadata, bidding counters, and metadata mappings. The data nodes (130A, 130B, 130N) may also generate and provide to the data processor (120) system metadata (122) discussed above. The data nodes (130A, 130B, 130N) may also include the functionality to perform the DAG operations if selected to do so by the data processor (120). For more information regarding the performance of DAG operations, refer to FIGS. 3A-3E. The data nodes (130A, 130B, 130N) may include other and/or additional functionality without departing from the invention.

In one or more embodiments of the invention, each data node (130A, 130B, 130N) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, which when executed by the processor(s) of the computing device cause the computing device to perform the functionality of the data node (130A, 130B, 130N) described throughout this application.

In one or more embodiments of the invention, each of the data nodes (130A, 130B, 130N) is implemented as a logical device. The logical device may utilize the computing resources of any number of computing devices and thereby provide the functionality of the data nodes (130A, 130B, 130N) described throughout this application. For additional details regarding the data nodes (130A, 130B, 130N), see, e.g., FIG. 1D-1E.

Figure 1C:
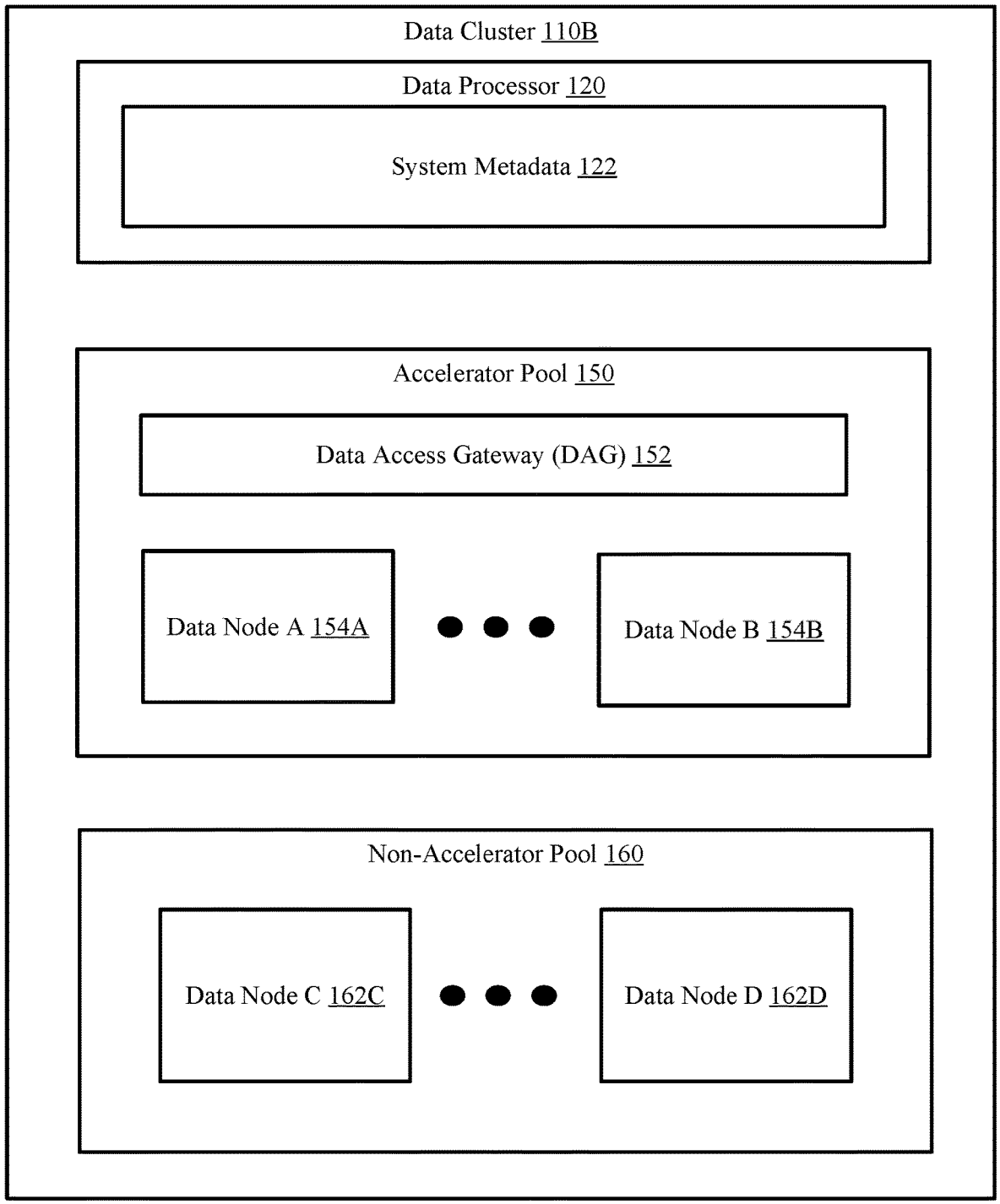
FIG. 1C shows a diagram of a data cluster with an accelerator pool in accordance with one or more embodiments of the invention.

FIG. 1C shows a diagram of a data cluster (110B) with an accelerator pool in accordance with one or more embodiments of the invention. The data cluster (110B) may be an embodiment of the data cluster (110, FIG. 1A) discussed above. The data cluster (110B) may include a data processor (120), an accelerator pool (150), and a non-accelerator pool (160). The accelerator pool (130) may include a data access gateway (DAG) (152) and any number of data nodes (154A, 154B). Similarly, the non-accelerator pool (160) includes any number of data nodes (162C, 162D). The components of the data cluster (120) may be operably connected via any combination of wired and/or wireless connections. Each of the aforementioned components is discussed below.

In one or more embodiments of the invention, the data processor (120) is a device (physical or logical) that includes the functionality to determine whether to perform various DAG operations and, if so, where in the data cluster to perform the DAG operations. The DAG operations may include discovery operations, bidding counter operations, and metadata mapping operations. Additionally, in one or more embodiments of the invention, the data processor (120) obtains system metadata (122) (discussed below) and uses the system metadata (122) to determine where to perform the DAG operations. The data processor (120) may determine where to perform DAG operations via the method illustrated in FIG. 3F.

In one or more of embodiments of the invention, the data processor (120) is implemented as computer instructions, e.g., computer code, stored on a persistent storage device of a data node (e.g., 154A, 154B, 162C, 162D) that when executed by a processor of a data node (e.g., 154A, 154B, 162C, 162D) cause the data node (e.g., 154A, 154B, 162C, 162D) to provide the aforementioned functionality of the data processor (120) described throughout this application and/or all, or a portion thereof, of the method illustrated in FIG. 3F.

In one or more embodiments of the invention, the data processor (120) is implemented as a computing device (see e.g., FIG. 5), is operatively connected to (but separate from) the data nodes (e.g., 154A, 154B, 162C, 162D) in the data cluster. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (120) described throughout this application and/or all, or a portion thereof, of the methods illustrated in FIG. 3F.

In one or more embodiments of the invention, the data processor (120) is implemented as a logical device. The logical device may utilize the computing resources of any number of computing devices and thereby provide the functionality of the data processor (120) described throughout this application and/or all, or a portion thereof, of the methods illustrated in FIG. 3F.

In one or more embodiments of the invention, system metadata (122) may be one or more data structures that may include metadata associated with and obtained from each component of the data cluster (110B), not including the data processor (120). The system metadata may include computational capability information and prior performance information for each component of the data cluster. The system metadata (122) may include other and/or additional information regarding each component in the data cluster (110B) without departing from the invention. The computational capability information and prior performance information are discussed below.

The computational capability information may indicate whether the host has the necessary computational resources to perform various DAG operations. The computational capability information may include, for example, the underlying hardware of each component of the data cluster (110B) and the processing capabilities of the underlying hardware. The computational capability information may include other and/or additional information that indicates whether a component of the data cluster (110B) is able to perform various DAG operations without departing from the invention.

The prior performance information may include information regarding past DAG operations and requests performed by the components of the data cluster (110B). The prior performance information may include, for example, latency, throughput, and computational overhead associated with previous DAG operations and requests. The prior performance information may include other and/or additional information associated with the performance of prior operations without departing from the invention.

In one or more embodiments of the invention, the DAG (152) is a device that includes functionality to determine a data node (e.g., 154A, 154B, 162C, 162D) of the data cluster (110B) to service (or process) a request from a host (e.g., 100, FIG. 1A). The DAG (152) may perform any combination of the DAG operations as determined by the data processor (120). As discussed above, the DAG operations may include discovery operations, bidding counter operations, and metadata mapping operations. The DAG operations performed by the DAG (152) may determine a data node to service a request using discovery metadata, bidding counters, and/or metadata mappings (discussed below) obtained from each data node (e.g., 154A, 154B, 162C, 162D) of the data cluster (110B). For additional information regarding the performance of the DAG operations, refer to FIGS. 3A-3E. the DAG (152) may include other and/or additional functionality without departing from the invention.

In one or more of embodiments of the invention, the DAG (152) is implemented as computer instructions, e.g., computer code, stored on a persistent storage that when executed by a processor of a data node (e.g., 154A, 154B) of the accelerator pool (150) cause the data node to provide the aforementioned functionality of the DAG (152) described throughout this application and/or all, or a portion thereof, of the methods illustrated in FIGS. 3A-3E.

In one or more embodiments of the invention, the DAG (152) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the DAG (152) described throughout this application and/or all, or a portion thereof, of the method illustrated in FIGS. 3A-3E.

In one or more embodiments of the invention, the DAG (152) is implemented as a logical device. The logical device may utilize the computing resources of any number of computing devices and thereby provide the functionality of the DAG (152) described throughout this application and/or all, or a portion thereof, of the method illustrated in FIGS. 3A-3E.

Continuing with the discussion of FIG. 1C, different data nodes in the data cluster (110B) may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into an accelerator pool (150) including nodes that have more computing resources, e.g., high performance nodes (154A, 154B) than other nodes and a non-accelerator pool (160) including nodes that have fewer computing resources, e.g., low performance nodes (162C, 162D) than the nodes in the accelerator pool (150). For example, nodes of the accelerator pool (150) may include enterprise class solid state storage resources that provide very high storage bandwidth, low latency, and high input-outputs per second (TOPS). In contrast, the nodes of the non-accelerator pool (160) may include hard disk drives that provide lower storage performance. Bidding counters associated with data nodes of the accelerator pool (150) may, generally, be higher and include more emphasis towards them than bidding counters associated with data nodes of the non-accelerator pool (160) due to the improved performance of data nodes in the accelerator pool (150). While illustrated in FIG. 1C as being divided into two groups, the nodes may be divided into any number of groupings based on the relative performance level of each node without departing from the invention.

In one or more embodiments of the invention, the data nodes (154A, 154B, 162C, 162D) store data chunks and/or parity chunks. The data nodes (154A, 154B, 162C, 162D) may include persistent storage that may be used to store the data chunks and parity chunks. The data nodes (154A, 154B, 162C, 162D) may also service requests for the host (100). The data nodes (154A, 154B, 162C, 162D) may also include the functionality to generate and provide to the DAG (152) discovery metadata, bidding counters, and metadata mappings. The data nodes (154A, 154B, 162C, 162D) may also generate and provide to the data processor (120) system metadata (122) discussed above. The data nodes (154A, 154B, 162C, 162D) may also include the functionality to perform the DAG operations if selected to do so by the data processor (120). For more information regarding the performance of DAG operations, refer to FIGS. 3A-3E. The data nodes (154A, 154B, 162C, 162D) may include other and/or additional functionality without departing from the invention.

In one or more embodiments of the invention, each data node (154A, 154B, 162C, 162D) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (154A, 154B, 162C, 162D) described throughout this application and/or all, or a portion thereof, of the method illustrated in FIG. 3A-3F.

In one or more embodiments of the invention, the data nodes (154A, 154B, 162C, 162D) are implemented as a logical device. The logical device may utilize the computing resources of any number of computing devices and thereby provide the functionality of the data nodes (154A, 154B, 162C, 162D) described throughout this application and/or all, or a portion thereof, of the method illustrated in FIG. 3A-3F.

Figure 1D:
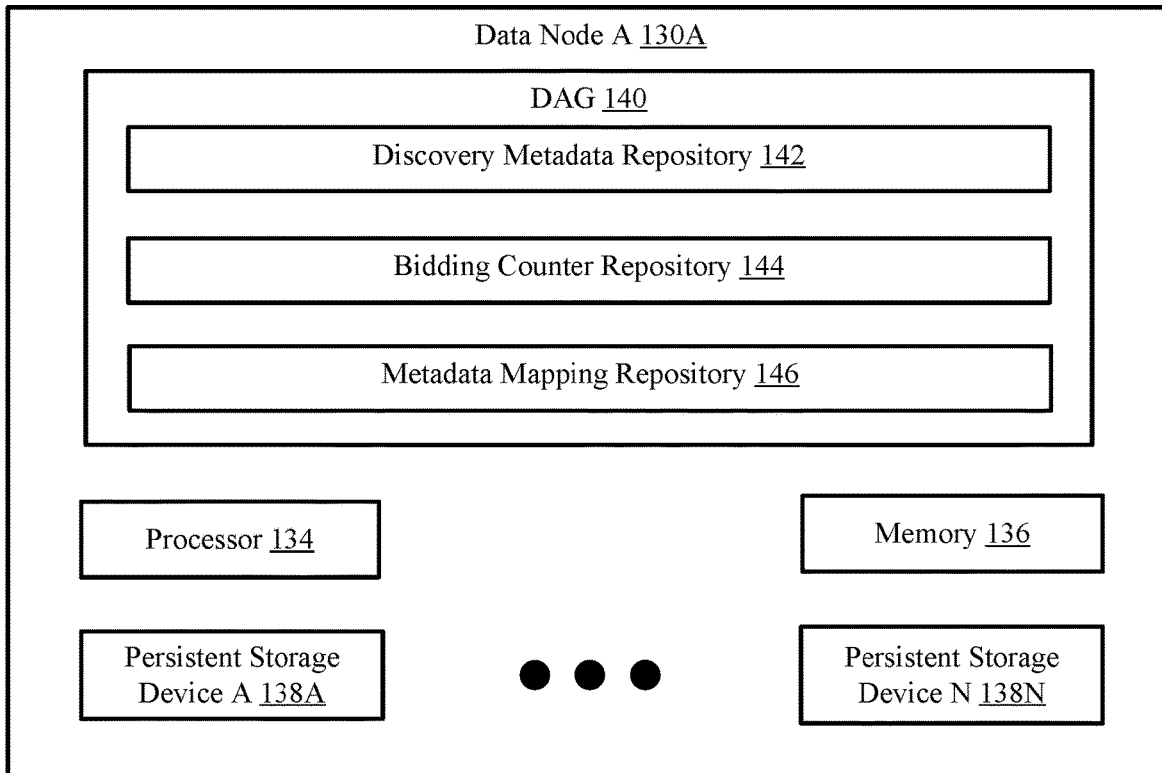
FIG. 1D shows a diagram of a data node with a data access gateway in accordance with one or more embodiments of the invention.

FIG. 1D shows a diagram of a data node with a data access gateway (DAG) in accordance with one or more embodiments of the invention. The data node (130A) may be an embodiment of the data nodes (e.g., 130A, 130B, 130N, FIG. 1B; 154A, 154B, 162C, 162D, FIG. 1C) discussed above. The data node (130A) may include a DAG (140) as determined, e.g., by a data processor (e.g., 120, FIG. 1B). The data node (130A) may also include a processor (134), memory (136), and one or more persistent storage devices (138A, 138N). The components of the data node may be operably connected via any combination of wired and/or wireless connections. Each of the aforementioned components is discussed below.

In one or more embodiments of the invention, the DAG (140) is a device (physical or logical) that includes functionality to determine a data node (e.g., 154A, 154B, 162C, 162D) of the data cluster (110B) to service a request from a host (e.g., 100, FIG. 1A). The DAG (140) may be an embodiment of the DAGs (140, FIG. 1B; 152, FIG. 1C) discussed above. The DAG may select data nodes to service requests from hosts via DAG operations. The DAG operations may include discovery operations, bidding counter operations, and/or metadata mapping operations. To perform the aforementioned operations, the DAG (140) may use data structures stored in a discovery metadata repository (142), bidding counter repository (144), and/or a metadata mapping repository (146). Each of these components is discussed below. For additional information regarding the DAG (140) refer to FIGS. 1B-1C.

In one or more embodiments of the invention, the discovery metadata repository (142) includes one or more data structures that include discovery metadata. The discovery metadata may include one or more lists of data node identifiers associated with the data nodes (e.g., 130A, 130B, 130N, FIG. 1B) of the data cluster (e.g., 110A) that are available to service requests obtained from the host (e.g., 100, FIG. 1A). The data node identifiers may be used by the DAG (140) to differentiate a particular data node of the data cluster. A data node identifier may be a unique global bit string or character string that is associated with a data node of the data cluster.

The discovery metadata repository (142) may also include retry counts and retry limits (not shown) associated with each data node (e.g., 130A, 130B, 130N, FIG. 1B). The retry counts may be numbers. a retry count may specify the amount of the times a request has been retried on a data node (e.g., 130A, 130B, 130N, FIG. 1B). The DAG (140) may increment retry counts when requests are retried on data nodes (e.g., 130A, 130B, 130N, FIG. 1B). The DAG (140) may reset retry counts when a request is serviced by a data node (e.g., 130A, 130B, 130N, FIG. 1B) and/or a new request is obtained. The retry limits may be numbers. A retry limit may specify the maximum allowable times a request may be retried for a data node (e.g., 130A, 130B, 130N, FIG. 1B).

The DAG (140) may update the discovery metadata repository (142) based on newly obtained discovery metadata (142) from the data nodes (e.g., 130A, 130B, 130N, FIG. 1B). The DAG (140) may use the discovery metadata of the discovery metadata repository (142) to determine which data nodes (e.g., 130A, 130B, 130N) of the data cluster (e.g., 110A, FIG. 1B) are available to service requests obtained from the host (100, FIG. 1A). The discovery metadata repository (142) may include other and/or additional information and may be used for other and/or additional purposes without departing from the invention.

In one or more embodiments of the invention, the bidding counter repository (144) may include one or more data structures that include bidding counters. The bidding counters may be numerical representations of the computational, network, and/or storage resources available to data nodes (e.g., 130A, 130B, 130N, FIG. 1B) of a data cluster (e.g., 110A, FIG. 1B). Each of the bidding counters may be associated with a data node (e.g., 130A, 130B, 130N, FIG. 1B). A data node (e.g., 130A) associated with a high bidding counter may have a large amount of computational, network, and storage resources available and may be better suited to service a request obtained from a host (e.g., 100, FIG. 1A) comparted to a data node (e.g., 130B, FIG. 1B) with a low bidding counter. Each of the bidding counters may be associated with a point in time. The DAG (140) may use the bidding counters to determine which data nodes (e.g., 130A, 130B, 130N, FIG. 1B) have the most available computing, network, and/or storage resources to service requests obtained from the host (100, FIG. 1A) based on the bidding counters of the bidding counter repository (144). The bidding counter repository (144) may include other and/or additional information and may be used for other and/or additional purposes without departing from the invention. For additional information regarding the bidding counter repository (144), refer to FIG. 2A.

In one or more embodiments of the invention, the metadata mapping repository (144) may include one or more data structures that include metadata mappings. The metadata mappings may include metadata associated with the data stored in each of the data nodes (e.g., 130A, 130B, 130N, FIG. 1B) of a data cluster (e.g., 110A, FIG. 1B). Each of the metadata mappings may be associated with a data node (e.g., 130A, 130B, 130N, FIG. 1B). Each of the metadata mappings may be updated by the DAG (140) based on newly obtained metadata mappings. The DAG (140) may use the metadata mappings to determine data nodes (e.g., 130A, 130B, 130N, FIG. 1B) that include the data necessary to service requests obtained from the host (100, FIG. 1A). The metadata mapping repository (146) may include other and/or additional information and may be used for other and/or additional purposes without departing from the invention. For additional information regarding the metadata mapping repository (146), refer to FIG. 2B.

While the data structures (e.g., 142, 144, 146) of the DAG (140) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in storage of the DAG (140), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

In one or more embodiments of the invention, the processor (134) is a component that processes data and services requests. The processor (134) may be, for example, a central processing unit (CPU). The processor (134) may be other types of processors without departing from the invention. The processor (134) may service a request to store data and/or metadata and rebuild data and/or metadata using data stored in memory (136), the persistent storage devices (138A, 138N), and/or other data nodes (e.g., 130B, 130N, FIG. 1B). The processor (134) may service other requests without departing from the invention.

In one or more embodiments of the invention, the data node (130A) includes memory (136), which stores data that is more accessible to the processor (134) than the persistent storage devices (138A, 138N). The memory (136) may be volatile storage. Volatile storage may be storage that stores data that is lost when the storage loses power. The memory (136) may be, for example, Random Access Memory (RAM). In one or more embodiments of the invention, a copy of the data and/or parity chunks required to service a request are stored in the memory (136) of the data node (130A).

In one or more embodiments of the invention, the persistent storage devices (138A, 138N) store data and rebuild data. The data may be data chunks and/or parity chunks. The persistent storage devices (138A, 138N) may include non-volatile storage (also referred to as persistent storage). In other words, the data stored in the persistent storage devices (138A, 138N) is not lost or removed when the persistent storage devices (138A, 138N) lose power. For additional details regarding the persistent storage devices (138A, 138N) see, e.g., FIG. 1E.

Figure 1E:
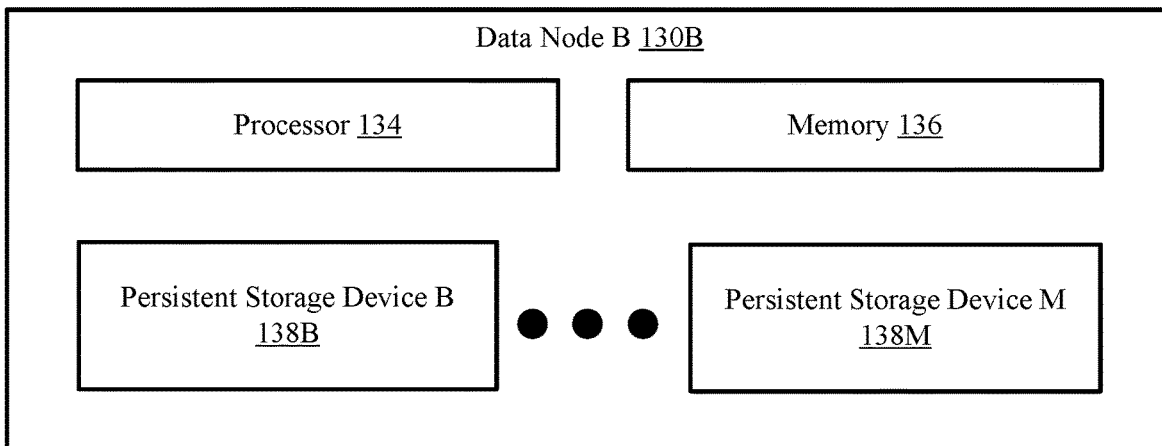
FIG. 1E shows a diagram of a data node without a data access gateway in accordance with one or more embodiments of the invention.

FIG. 1E shows a diagram of a data node without a data access gateway (DAG) in accordance with one or more embodiments of the invention. The data node (130A) may be an embodiment of the data nodes (e.g., 130A, 130B, 130N, FIG. 1B; 154A, 154B, 162C, 162D, FIG. 1C) discussed above. The data node (130B) may not include a DAG (e.g., 140, FIG. 1D) as determined by a data processor (e.g., 120, FIG. 1B). The data node (130A) may also include a processor (134), memory (136), and one or more persistent storage devices (138A, 138N). The components of the data node may be operably connected via any combination of wired and/or wireless connections. Each of the aforementioned components is discussed below.

In one or more embodiments of the invention, the processor (134) is a component that processes data and services requests. The processor (134) may be, for example, a central processing unit (CPU). The processor (134) may be other types of processors without departing from the invention. The processor (134) may service a request to store data and/or metadata and rebuild data and/or metadata using data stored in memory (136), the persistent storage devices (138A, 138N), and/or other data nodes (e.g., 130B, 130N, FIG. 1B). The processor (134) may service other requests without departing from the invention.

In one or more embodiments of the invention, the data node (130A) includes memory (136), which stores data that is more accessible to the processor (134) than the persistent storage devices (138B, 138M). The memory (136) may be volatile storage. Volatile storage may be storage that stores data that is lost when the storage loses power. The memory (136) may be, for example, Random Access Memory (RAM). In one or more embodiments of the invention, a copy of the data and/or parity chunks required to service a request are stored in the memory (136) of the data node (130A).

In one or more embodiments of the invention, the persistent storage devices (138B, 138M) store data and rebuild data. The data may be data chunks and/or parity chunks. The persistent storage devices (138B, 138M) may include non-volatile storage (also referred to as persistent storage). In other words, the data stored in the persistent storage devices (138B, 138M) is not lost or removed when the persistent storage devices (138B, 138M) lose power. For additional details regarding the persistent storage devices (138B, 138M) see, e.g., FIG. 1F.

Figure 1F:
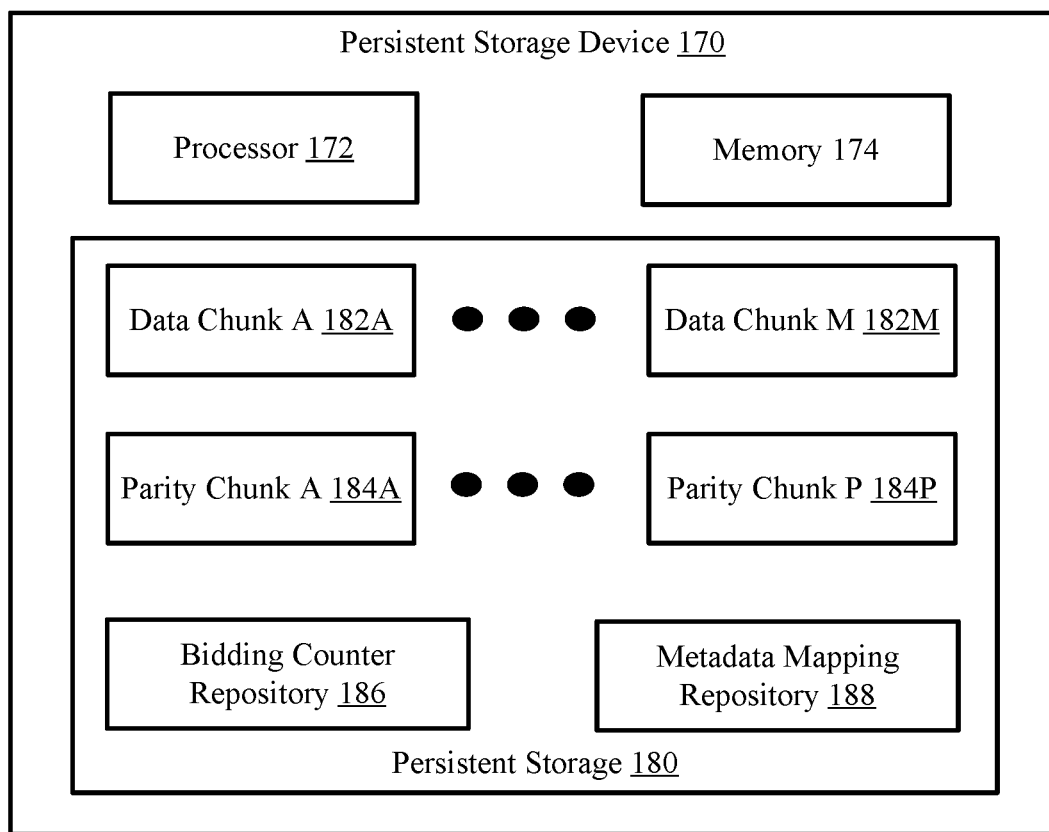
FIG. 1F shows a diagram of a persistent storage device in accordance with one or more embodiments of the invention.

FIG. 1F shows a diagram of a persistent storage device (170) in accordance with one or more embodiments of the invention. The persistent storage device (170) may be an embodiment of a persistent storage device discussed above (e.g., 138A, 138N, 138B, 138M) discussed above. As discussed above, the persistent storage device (170) stores and rebuilds data. The data may be data chunks (182A, 182M) and parity chunks (184A, 184P). The data may also include a bidding counter repository (186) and a metadata mapping repository (188). The persistent storage device (170) may include a processor (172), memory (174), and persistent storage (180). Each of these components is discussed below.

In one or more embodiments of the invention, the processor (172) is a component that processes data and services requests. The processor (172) may be, for example, a central processing unit (CPU). The processor (172) may be other types of processors without departing from the invention. The processor (172) may service a request to store data and rebuild data using data stored in persistent storage (180) or from other persistent storage devices (e.g., 138A, 138N, FIG. 1D). The processor (172) may service other requests without departing from the invention.

In one or more embodiments of the invention, the persistent storage device (170) includes memory (174), which stores data that is more accessible to the processor (172) than the persistent storage (180). The memory (174) may be volatile storage. Volatile storage may be storage that stores data that is lost when the storage loses power. The memory (174) may be, for example, Random Access Memory (RAM). In one or more embodiments of the invention, a copy of the data and/or parity chunks required for a persistent storage device rebuilding operation are stored in the memory (174) of the persistent storage device (170).

As discussed above, the persistent storage (170) may store data. The data stored in persistent storage (170) may include data chunks (182A, 182M) and parity chunks (184A, 184P). The persistent storage (180) may also store a bidding counter repository (186) and a metadata mapping repository (188). Each of these data structures is discussed below. The persistent storage (180) may store other and/or additional data without departing from the invention.

The persistent storage (180) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (160) may utilize portions of any combination of hard disk drives, solid state disk drives, tape drives, and/or any other physical storage medium of any number of computing devices.

In one or more embodiments of the invention, a data chunk (182A, 182M) is a data structure that includes a portion of data that was obtained from a host. The data chunks (182A, 182M) may be (but are not required to be) deduplicated by a data processor and obtained by the persistent storage device (170) from the data processor. Each of the data chunks (182A, 182M) may be used by the persistent storage device (170) (or another persistent storage device) to reconstruct another data chunk or a parity chunk based on an erasure coding algorithm that was applied to the other data chunk or parity chunk.

In one or more embodiments of the invention, a parity chunk (184A, 184P) is a data structure that includes a parity value generated using an erasure coding algorithm. The parity value may be generated by applying the erasure coding algorithm to one or more data chunks stored in the persistent storage device (170) or other data nodes. Each of the parity chunks (184A, 184P) may be used by the persistent storage device (170) (or another persistent storage device) to reconstruct another parity chunk or a data chunk based on an erasure coding algorithm that was applied to the other parity chunk or data chunk.

In one or more embodiments of the invention, the bidding counter repository (186) may include one or more data structures that include bidding counters associated with the data nodes that includes the persistent storage device (170). The bidding counters may be numerical representations of the computational, network, and/or storage resources available to a data node (e.g., 130A, FIG. 1B) of a data cluster (e.g., 110A, FIG. 1B) that includes the persistent storage device (170). Each of the bidding counters may be associated with a point in time. Each of the bidding counters may include a data node identifier (not shown, discussed above) to which they are associated. The data node identifier may be A DAG (e.g., 140, FIG. 1B) may use the bidding counters to determine whether the data node (e.g., 130A, FIG. 1B) that includes the persistent storage device (170) is to service a request from the host (100, FIG. 1A). The bidding counters of the bidding counter repository (186) may be generated by the data node (e.g., 110A, FIG. 1B) that includes the persistent storage device (170) and sent to the DAG (e.g., 140, FIG. 1B). The bidding counter repository (186) may include other and/or additional information and may be used for other and/or additional purposes without departing from the invention. For additional information regarding bidding counters of the bidding counter repository (186), refer to FIG. 2A.

In one or more embodiments of the invention, the metadata mapping repository (188) may include one or more data structures that include metadata mappings associated with the data node (e.g., 130A, FIG. 1B) that includes the persistent storage device (170). The metadata mappings may include metadata associated with the data stored in each of the data node (e.g., 130A, FIG. 1B) that includes the persistent storage device (170). The metadata mapping repository (188) may be updated by the data node (e.g., 130A, FIG. 1B) that includes the persistent storage device (170) or a component therein based on newly obtained metadata mappings associated with the data node (e.g., e.g., 130A, FIG. 1B) that includes the persistent storage device (170).

The metadata mappings of the metadata mapping repository may be sent to the DAG (e.g., 140, FIG. 1B). The DAG (e.g., 140, FIG. 1B) may use the metadata mappings to determine whether the data node (e.g., e.g., 130A, FIG. 1B) that includes the persistent storage device (170) includes the data necessary to service requests obtained from the host (100, FIG. 1A). The metadata mapping repository (188) may include other and/or additional information and may be used for other and/or additional purposes without departing from the invention. For additional information regarding metadata mappings of the metadata mapping repository (188), refer to FIG. 2B.

Figure 2A:
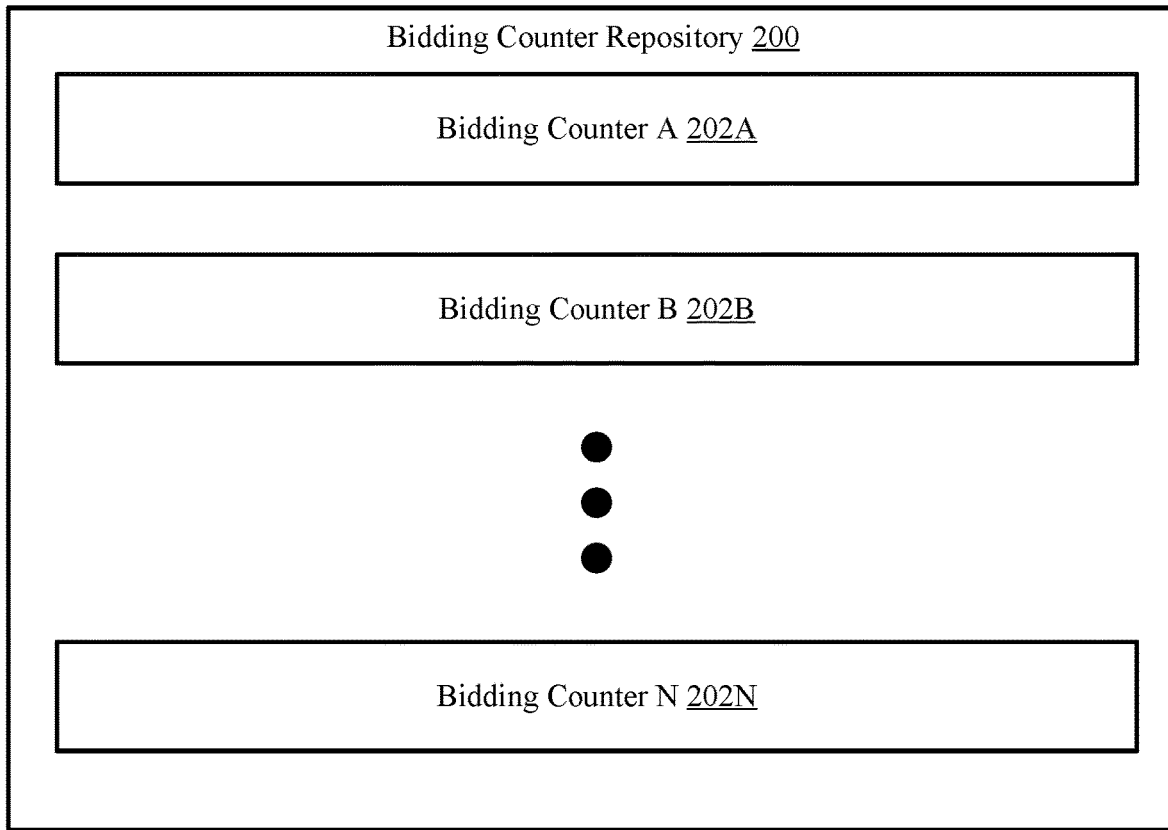
FIG. 2A shows a diagram of a bidding counter repository in accordance with one or more embodiments of the invention.

FIG. 2A shows a diagram of a bidding counter repository (200) in accordance with one or more embodiments of the invention. The bidding counter repository (200) may be an embodiment of the bidding counter repository (144, FIG. 1D) discussed above. As discussed above, the bidding counter repository (200) includes any number of bidding counters (e.g., 202A, 202B, 202N) without departing from the invention. Each of the aforementioned portions of bidding counter repository (200) is discussed below.

In one or more embodiments of the invention, the bidding counters (e.g., bidding counter A (202A), bidding counter B (202B), and bidding counter N (202N)) are one or more data structures that include numerical representations of the computational, network, and storage resources (discussed below) of the data nodes of a data cluster that are available at a point in time. In one embodiment of the invention, a bidding counter (e.g., 202A) may include a single numerical value (not shown) that represents as a whole the computational, network, and storage resources of a data node (e.g., 130, FIG. 1B) that are available at a point in time. In another embodiment of the invention, a bidding counter (e.g., 202A) may include three numerical values (not shown), each of which represents the computation, network, and storage resources of a data node (e.g., 130, FIG. 1B) respectively that are available at a point in time.

A bidding counter (e.g., 202A) that includes a higher numerical value may be associated with a data node (e.g., 130A, FIG. 1B) that includes a higher availability of resources at the point in time associated with the bidding counter (e.g., 202A). The bidding counters (e.g., 202A, 202B, 202N) may also include timestamps (not shown) that denote the point in time in which the bidding counters (e.g., 202A, 202B, 202N) were generated. Each of the bidding counters may be associated with a point in time. Each of the bidding counters may include a data node identifier (not shown, discussed above) to which they are associated. The bidding counters (e.g., 202A, 202B, 202N) may be generated by data nodes (e.g., 130A, 130B, 130N, FIG. 1B) to which they are associated and may be used by the DAG (e.g., 140, FIG. 1B) to determine which data node (e.g., 130A, FIG. 1B) services a request obtained from the host (100, FIG. 1A). The bidding counters (e.g., 202A, 202B, 202N) may include other and or additional information without departing from the invention.

The computational resources of a data node (e.g., 130A, FIG. 1B) may refer to the amount, or type of processors and memory available to the data node (e.g., 130A, FIG. 1B) to perform calculations and service requests. The computational resources of a data node (e.g., 130A, FIG. 1B) may refer to other and/or additional information associated with the computational capabilities of the data node (e.g., 130A, FIG. 1B) without departing from the invention.

The network resources of a data node (e.g., 130A, FIG. 1B) may refer to the amount, or type of network cards and total network bandwidth available to the data node (e.g., 130A, FIG. 1B) to perform calculations and service requests. The network resources of a data node (e.g., 130A, FIG. 1B) may refer to other and/or additional information associated with the network capabilities of the data node (e.g., 130A, FIG. 1B) without departing from the invention.

The storage resources of a data node (e.g., 130A, FIG. 1B) may refer to the amount, or type of persistent storage and total storage capacity available to the data node (e.g., 130A, FIG. 1B) to perform calculations and service requests. The storage resources of a data node (e.g., 130A, FIG. 1B) may refer to other and/or additional information associated with the storage capabilities of the data node (e.g., 130A, FIG. 1B) without departing from the invention.

Figure 2B:
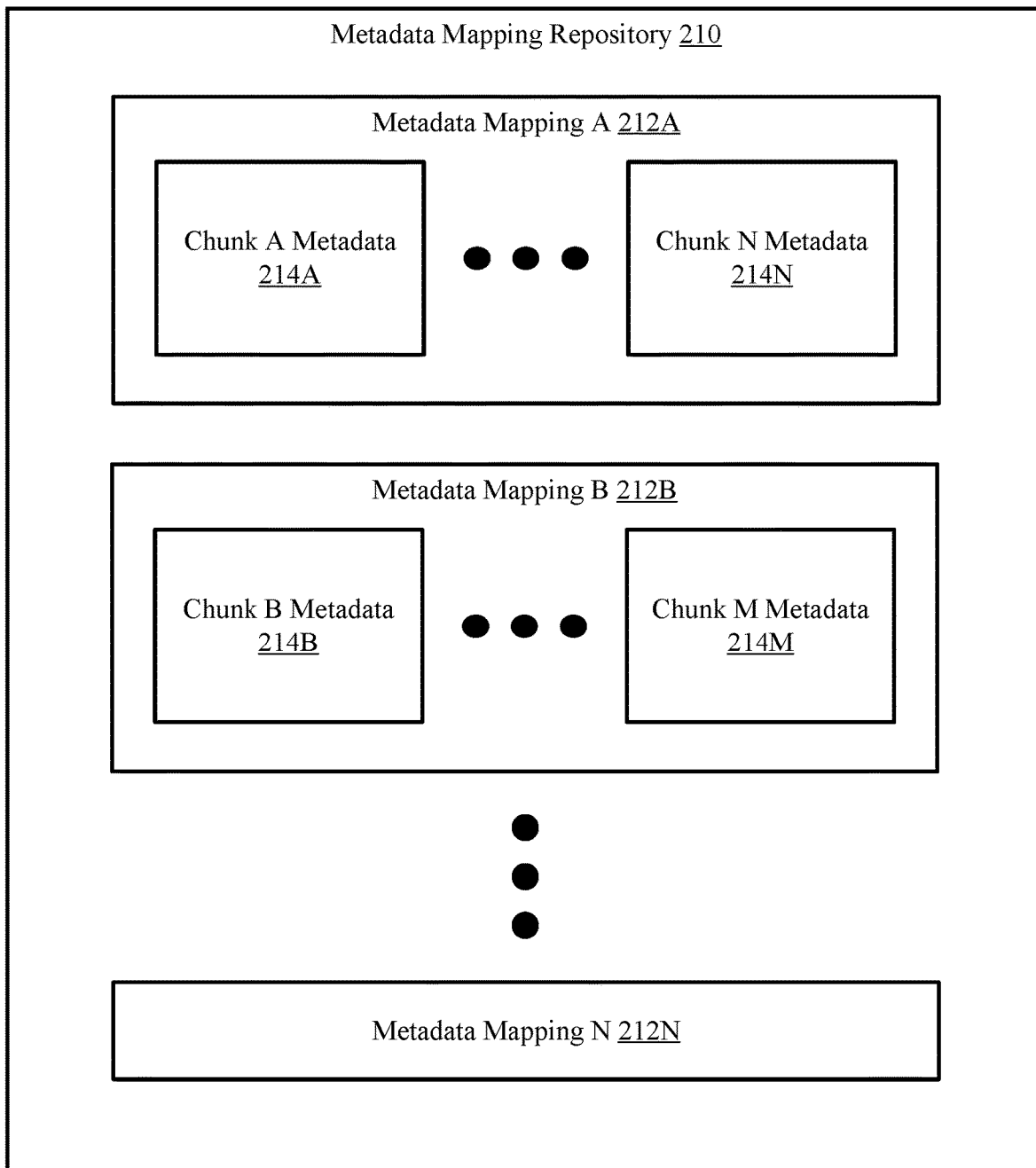
FIG. 2B shows a diagram of a metadata mapping repository in accordance with one or more embodiments of the invention.

FIG. 2B shows a diagram of a metadata mapping repository (210) in accordance with one or more embodiments of the invention. The metadata mapping repository (210) may be an embodiment of the metadata mapping repository (146, FIG. 1D) discussed above. As discussed above, the metadata mapping repository (210) includes any number of metadata mappings (e.g., 212A, 212B, 212N) without departing from the invention. Each of the aforementioned portions of metadata mapping repository (210) is discussed below.

In one or more embodiments of the invention, the metadata mappings (e.g., metadata mapping A (212A), metadata mapping B (212B), metadata mapping N (212N)) may be one or more data structures that includes chunk metadata (e.g., chunk A metadata (214A), chunk A metadata (214N), chunk B metadata (214B), chunk M metadata (214M)). Each metadata mapping (e.g., 212A, 212B, 212N) may be associated with a data node (e.g., 130A, 130B, 130N, FIG. 1B) of the data cluster (e.g., 110A, FIG. 1B). Each of the metadata mappings (e.g., 212A, 212B, 212N) may include a data node identifier (not shown, discussed above) to which they are associated. Each metadata mapping (e.g., 212A, 212B, 212N) may include an accelerator pool flag that may indicate whether the metadata mapping is associated with a data node of the accelerator pool (150, FIG. 1C) or the non-accelerator pool (160, FIG. 1C). Each chunk metadata (214A, 214N, 214B, 214M) may correspond to metadata for a data chunk or a parity chunk stored in the associated data node (e.g., 130A, FIG. 1B). Each chunk metadata (214A, 214N, 214B, 214M) may include information about a chunk such as, for example, a unique identifier (e.g., a fingerprint) that may be used to differentiate the chunks stored in the data cluster (e.g., 110A, FIG. 1B), a storage location of the chunk (e.g., the persistent storage device in which the chunk is stored), and a data slice identifier that identifies the data slice in which the chunk is associated (if generated using an erasure coding procedure. The chunk metadata (214A, 214N, 214B, 214M) may include other and/or additional information regarding the chunks stored in a data node (e.g., 130A, FIG. 1B) without departing from the invention.

The metadata mappings (e.g., 212A, 212B, 212N) may be generated by the data nodes (e.g., 130A, 130B, 130N, FIG. 1B) associated with the metadata mappings (e.g., 212A, 212B, 212N). The metadata mappings (e.g., 212A, 212B, 212N) may be used by the DAG (e.g., 140, FIG. 1B) to determine whether a data node (e.g., 130A, FIG. 1B) has the necessary data to service a request. The metadata mappings (e.g., 212A, 212B, 212N) of the metadata mapping repository may be updated by the DAG (e.g., 140, FIG. 1B) based on newly obtained metadata mappings. The metadata mappings (e.g., 212A, 212B, 212N) of the metadata mapping repository (210) may include other and/or additional information without departing from the invention.

FIGS. 3A-3B show flowcharts of a method for performing data access gateway operations in accordance with one or more embodiments of the invention. The method shown in FIGS. 3A-3B may be performed by, for example, a DAG (140, FIG. 1B). Other components of the data clusters (e.g., 110A, 110B) illustrated in FIGS. 1B and 1C may perform the method of FIGS. 3A-3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3A, in step 300, a request is obtained from a host. In one or more embodiments of the invention, the host sends a message to the DAG. The message may include a request that is to be processed by data nodes of the data cluster. The request may include data. The request may be obtained from the host via other and/or additional methods without departing from the invention.

In step 302, discovery metadata is obtained from each data node in a data cluster. In one or more embodiments of the invention, the DAG sends a message to each of the data nodes of the data cluster. The messages may include requests for discovery metadata from each data node. In response to obtaining the request, the data nodes may generate discovery metadata. The discovery metadata may indicate whether a data node of the data cluster is available to service the request. The data nodes may send the discovery metadata to the DAG. Discovery metadata may be obtained from each data node in a data cluster via other and/or additional methods without departing from the invention.

In step 304, the discovery metadata repository is updated based on the obtained discovery metadata. As discussed above, the generated discovery metadata may include the data node identifiers associated with data nodes that are available to service the request. The discovery metadata repository may include a list of data node identifiers associated with the data nodes that were available to service the previous request. The DAG may update the discovery metadata repository by adding and/or deleting data node identifiers from the discovery metadata repository, and updating the timestamps associated with the data node identifiers included in the discovery metadata repository based on the obtained discovery metadata. The retry counts associated with the included data node identifiers may also be reset to zero. The discovery metadata repository may be updated based on the obtained discovery metadata via other and/or additional methods without departing from the invention. Steps 302-304 may be performed prior to step 300 and/or may be performed periodically to obtain discovery metadata. In such scenarios, step 306 may be performed after step 300 and not after step 304.

In step 306, a data node is identified based on the discovery metadata repository. In one or more embodiments of the invention, the DAG identifies a data node by identifying a data node identifier included in the discovery metadata repository. In one embodiment of the invention, the DAG may identify the first data node identifier in the list of data node identifiers included in the discovery metadata repository. In another embodiment of the invention, the DAG may also identify a random data node identifier in the list of data node identifiers included in the discovery metadata repository. The data node associated with the identified data node identifier may be the identified data node. A data node may be identifier based on the discovery metadata repository via other and/or additional methods without departing from the invention.

In step 308, the request is sent to the identified data node. In one or more embodiments of the invention, the DAG sends a message to the identified data node. The message may include the request obtained from the host. The request may be a copy of the request obtained from the host. The DAG may copy the request in the event that the identified data node is unable to perform the request and the DAG is required to send the request to another data node. The request may be sent to the identified data node via other and/or additional methods without departing from the invention.

Turning to FIG. 3B, in step 310, it is determined whether the data node is able to service the request. In one or more embodiments of the invention, the data node sends confirmation when a request is processed. The DAG may wait a predetermined amount of time to obtain the confirmation from the data node. If the DAG waits the predetermined amount of time and does not receive confirmation from the data node, the DAG may determine that the data node is unable to service the request. If the DAG obtains confirmation prior to the predetermined amount of time elapses, the DAG may determine that the data node is able to service the request. It may be determined whether the data node is able to service the request via other and/or additional methods without departing from the invention.

In another embodiment of the invention, the identified data node may be unavailable. The identified data node may have become unavailable in the time between generating discovery metadata and obtaining the request. The identified data node may have become unavailable due to network connection loss, power loss, and/or another or additional reasons without departing from the invention. If the identified data node is unavailable, then the DAG may determine that the data node is not able to service the request. If the data node is available, the DAG may wait for confirmation from the data node to determine if the data node is able to service the request as described above.

If it is determined that the data node is able to service the request, then the method may end following step 310. If it is determined that the data node is unable to service the request, then the method may proceed to step 312.

In step 312, the request is retried with the same data node and the retry count is updated in the discovery metadata. The DAG may retry the request by resending the request to the same data node. The DAG may also retry the request by waiting, again, the predetermined time for confirmation from the same data node. The DAG may also update the retry count associated with the data node in the discovery metadata repository by incrementing the retry count by one. The request may be retried and the retry count may be updated via other and/or additional methods without departing from the invention.

In step 314, it is determined whether the data node is able to service the request. In one or more embodiments of the invention, the data node sends confirmation when a request is processed. The DAG may wait a predetermined amount of time to obtain the confirmation from the data node. If the DAG waits the predetermined amount of time and does not receive confirmation from the data node, the DAG may determine that the data node is unable to service the request. If the DAG obtains confirmation prior to the predetermined amount of time elapses, the DAG may determine that the data node is able to service the request. It may be determined whether the data node is able to service the request via other and/or additional methods without departing from the invention.

In another embodiment of the invention, the identified data node may be unavailable. The identified data node may have become unavailable in the time between generating discovery metadata and obtaining the request. The identified data node may have become unavailable due to network connection loss, power loss, and/or another or additional reasons without departing from the invention. If the identified data node is unavailable, then the DAG may determine that the data node is not able to service the request. If the data node is available, the DAG may wait for confirmation from the data node to determine if the data node is able to service the request as described above.

If it is determined that the data node is able to service the request, then the method may end following step 314. If it is determined that the data node is unable to service the request, then the method may proceed to step 316.

In step 316, it is determined whether the retry limit is exceeded. In one or more embodiments of the invention, the DAG compares the retry count associated with the data node with the retry limit associated with the data node. If the retry count is greater than the retry limit, then the DAG may determine that the retry limit is exceeded. If the retry count in not greater than the retry limit, then the DAG may determine that the retry limit is not exceeded. The DAG may determine whether the retry limit is exceeded via other and/or additional methods without departing from the invention.

If it is determined that the retry limit is not exceeded, then the method may proceed to step 312. If it is determined that the retry limit is exceeded, then the method may proceed to step 318.

In step 318, the request is retried with a different data node based on the discovery metadata. The DAG may identify a different data node using the discovery metadata repository. In one embodiment of the invention, the DAG may identify the next data node by randomly identifying a data node identifier in the list of data node identifiers included in the discovery metadata repository that is associated with a retry count that is lower than a retry limit for that data node. In another embodiment of the invention, the DAG may identify the next data node identifier in the list of data node identifiers included in the discovery metadata repository that is associated with a retry count that is lower than a retry limit for that data node. The data node associated with the identified data node identifier may be the identified data node. The DAG may resend a copy of the request to the identified data node. The request may be retried with a different data node based on the discovery metadata repository via other and/or additional methods without departing from the invention. The method may proceed to step 310 following step 318.

FIG. 3C shows a flowchart of a method for performing data access gateway operations with bidding counters in accordance with one or more embodiments of the invention. The method shown in FIG. 3C may be performed by, for example, a DAG (140, FIG. 1B). Other components of the data clusters (e.g., 110A, 110B) illustrated in FIGS. 1B and 1C may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a request is obtained from a host. In one or more embodiments of the invention, the host sends a message to the DAG. The message may include a request that is to be processed by data nodes of the data cluster. The request may include data. The request may be obtained from the host via other and/or additional methods without departing from the invention.

In step 322, bidding counters are obtained from each data node. In one or more embodiments of the invention, the DAG sends a message to each of the data nodes of the data cluster. The messages may include requests for bidding counters from each data node. In response to obtaining the request, the data nodes may generate bidding counters. The bidding counters may indicate the computational, network, and storage resources available to the associated data nodes at the time the bidding counters were generated. The data nodes may send the bidding counters to the DAG. Bidding counters may be obtained from each data node in a data cluster via other and/or additional methods without departing from the invention.

In step 324, the data node with the highest bidding counter is identified. As discussed above, bidding counters may be numerical representations of the computational, network, and storage resources available for data nodes. The DAG may compare the obtained bidding counter with each other. The bidding counter with the highest numerical representation may be identified as the highest bidding counter. The DAG may identify the data node associated with the highest bidding counter using the data node identifier associated with the bidding counter. The data node with the highest bidding counter may be identified via other and/or additional methods without departing from the invention.

In step 326, the request is sent to the identified data node. In one or more embodiments of the invention, the DAG sends a message to the identified data node. The message may include the request obtained from the host. The request may be a copy of the request obtained from the host. The DAG may copy the request in the event that the identified data node is unable to perform the request and the DAG is required to send the request to another data node. The request may be sent to the identified data node via other and/or additional methods without departing from the invention.

In step 328, a determination is made as to whether the data node is able to service the request. In one or more embodiments of the invention, the data node sends confirmation when a request is processed. The DAG may wait a predetermined amount of time to obtain the confirmation from the data node. If the DAG waits the predetermined amount of time and does not receive confirmation from the data node, the DAG may determine that the data node is unable to service the request. If the DAG obtains confirmation prior to the predetermined amount of time elapses, the DAG may determine that the data node is able to service the request. It may be determined whether the data node is able to service the request via other and/or additional methods without departing from the invention.

In another embodiment of the invention, the identified data node may be unavailable. The identified data node may have become unavailable in the time between generating bidding counters and obtaining the request. The identified data node may have become unavailable due to network connection loss, power loss, and/or another or additional reasons without departing from the invention. If the identified data node is unavailable, then the DAG may determine that the data node is not able to service the request. If the data node is available, the DAG may wait for confirmation from the data node to determine if the data node is able to service the request as described above.

If it is determined that the data node is able to service the request, then the method may end following step 328. If it is determined that the data node is unable to service the request, then the method may proceed to step 330.

In step 330, the data node with the next highest bidding counter is identified. In one or more embodiments of the invention, the DAG compares all of the bidding counters that are lower than the bidding counter associated with the previous data node to identify the next highest bidding counter. Of the bidding counters that are lower than the bidding counter associated with the previous data node, the bidding counter with the highest numerical representation is identified as the next highest bidding counter. The DAG may identify the data node associated with the next highest bidding counter using the data node identifier associated with the next highest bidding counter. The data node with the next highest bidding counter may be identified via other and/or additional methods without departing from the invention.

In step 332, the request is sent to the identified data node. In one or more embodiments of the invention, the DAG sends a message to the identified data node. The message may include the request obtained from the host. The request may be a copy of the request obtained from the host. The DAG may copy the request in the event that the identified data node is unable to perform the request and the DAG is required to send the request to another data node. The request may be sent to the identified data node via other and/or additional methods without departing from the invention.

In step 334, a determination is made as to whether the data node is able to service the request. In one or more embodiments of the invention, the data node sends confirmation when a request is processed. The DAG may wait a predetermined amount of time to obtain the confirmation from the data node. If the DAG waits the predetermined amount of time and does not receive confirmation from the data node, the DAG may determine that the data node is unable to service the request. If the DAG obtains confirmation prior to the predetermined amount of time elapses, the DAG may determine that the data node is able to service the request. It may be determined whether the data node is able to service the request via other and/or additional methods without departing from the invention.

In another embodiment of the invention, the identified data node may be unavailable. The identified data node may have become unavailable in the time between generating bidding counters and obtaining the request. The identified data node may have become unavailable due to network connection loss, power loss, and/or another or additional reasons without departing from the invention. If the identified data node is unavailable, then the DAG may determine that the data node is not able to service the request. If the data node is available, the DAG may wait for confirmation from the data node to determine if the data node is able to service the request as described above.

If it is determined that the data node is able to service the request, then the method may end following step 334. If it is determined that the data node is unable to service the request, then the method may proceed to step 330.

FIG. 3D shows a flowchart of a method for performing data access gateway operation with bidding counters and metadata mappings in accordance with one or more embodiments of the invention. The method shown in FIG. 3D may be performed by, for example, a DAG (140, FIG. 1B). Other components of the data clusters (e.g., 110A, 110B) illustrated in FIGS. 1B and 1C may perform the method of FIG. 3D without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, a request is obtained from a host. In one or more embodiments of the invention, the host sends a message to the DAG. The message may include a request that is to be processed by data nodes of the data cluster. The request may include data. The request may be obtained from the host via other and/or additional methods without departing from the invention.

In step 342, bidding counters are obtained from each data node. In one or more embodiments of the invention, the DAG sends a message to each of the data nodes of the data cluster. The messages may include requests for bidding counters from each data node. In response to obtaining the request, the data nodes may generate bidding counters. The bidding counters may indicate the computational, network, and storage resources available to the associated data nodes at the time the bidding counters were generated. The data nodes may send the bidding counters to the DAG. Bidding counters may be obtained from each data node in a data cluster via other and/or additional methods without departing from the invention.

In step 344, metadata mappings are obtained from each data node. In one or more embodiments of the invention, the DAG sends a message to each of the data nodes of the data cluster. The messages may include requests for metadata mappings from each data node. In response to obtaining the request, the data nodes may generate metadata mappings. The metadata mappings may include information regarding data stored in the data nodes at the time the metadata mappings were generated. The data nodes may send the metadata mappings to the DAG. The DAG may update the metadata mapping repository based on the obtained metadata mappings. The DAG may update the metadata mapping repository by adding, updating and/or deleting chunk metadata from the metadata mapping repository based on the obtained metadata mappings. Metadata mappings may be obtained from each data node in a data cluster via other and/or additional methods without departing from the invention.

In step 346, the data node to service the request is identified based on the obtained bidding counters and metadata mappings. In one embodiment of the invention, for requests associated with data previously stored on data nodes of the data cluster (e.g., read requests, update requests, deletion requests, and information requests) the DAG may use the metadata mappings of the metadata mappings to identify the data node(s) that include the data required to service the requests. Of the identified data nodes, the DAG may then identify the data node of the identified data nodes with the highest bidding counter as the identified data node to service the request.

In another embodiment of the invention, for requests that are not associated with data previously stored on the data nodes (e.g., write requests), the DAG identifies the data node to service the request using the bidding counters and not the metadata mappings. The DAG may compare the obtained bidding counter with each other. The bidding counter with the highest numerical representation may be identified as the highest bidding counter. The DAG may identify the data node associated with the highest bidding counter using the data node identifier associated with the bidding counter. The data node to service the request may be identified based on the obtained bidding counters and metadata mappings via other and/or additional methods without departing from the invention.

In step 348, the request is sent to the identified data node. In one or more embodiments of the invention, the DAG sends a message to the identified data node. The message may include the request obtained from the host. The request may be a copy of the request obtained from the host. The DAG may copy the request in the event that the identified data node is unable to perform the request and the DAG is required to send the request to another data node. The request may be sent to the identified data node via other and/or additional methods without departing from the invention.

The method may end following step 348.

FIG. 3E shows a flowchart of a method for performing data access gateway operations in a data cluster that includes an accelerator pool in accordance with one or more embodiments of the invention. The method shown in FIG. 3E may be performed by, for example, a DAG (140, FIG. 1B). Other components of the data clusters (e.g., 110A, 110B) illustrated in FIGS. 1B and 1C may perform the method of FIG. 3D without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 350, a request is obtained from a host. In one or more embodiments of the invention, the host sends a message to the DAG. The message may include a request that is to be processed by data nodes of the data cluster. The request may include data. The request may be obtained from the host via other and/or additional methods without departing from the invention.

In step 352, bidding counters are obtained from each data node. In one or more embodiments of the invention, the DAG sends a message to each of the data nodes of the data cluster. The messages may include requests for bidding counters from each data node. In response to obtaining the request, the data nodes may generate bidding counters. The bidding counters may indicate the computational, network, and storage resources available to the associated data nodes at the time the bidding counters were generated. The data nodes may send the bidding counters to the DAG. Bidding counters may be obtained from each data node in a data cluster via other and/or additional methods without departing from the invention.

In step 354, metadata mappings are obtained from each data node. In one or more embodiments of the invention, the DAG sends a message to each of the data nodes of the data cluster. The messages may include requests for metadata mappings from each data node. In response to obtaining the request, the data nodes may generate metadata mappings. The metadata mappings may include information regarding data stored in the data nodes at the time the metadata mappings were generated. The data nodes may send the metadata mappings to the DAG. The DAG may update the metadata mapping repository based on the obtained metadata mappings. The DAG may update the metadata mapping repository by adding, updating and/or deleting chunk metadata from the metadata mapping repository based on the obtained metadata mappings. Metadata mappings may be obtained from each data node in a data cluster via other and/or additional methods without departing from the invention.

In step 356, a determination is made as to whether the request may be serviced using the accelerator pool. In one or more embodiments of the invention, the DAG determines whether the request may be serviced using the accelerator by using the metadata mappings and the bidding counters. If the request is associated with data previously stored on the data cluster, then the DAG may use the metadata mappings to identify the data node(s) that are associated with the previously stored data. The DAG then identifies if whether the data node(s) associated with the previously stored data are within the accelerator pool using the accelerator pool flag included in the metadata mapping repository that is(are) associated with the identified data node(s). If the flag(s) is set, then the data node(s) associated with the previously stored data may be in the accelerator pool. If the flag(s) are not set, then the data nodes may be in the non-accelerator pool. If it is determined that the data node(s) associated with the previously stored data is in the accelerator pool, then the DAG may determine that the request may be serviced using the accelerator pool. If it is determined that the data node(s) associated with the previously stored data is not in the accelerator pool, then the DAG may determine that the request may not be serviced using the accelerator pool.

In another embodiment of the invention, for requests that are not associated with data previously stored in the data nodes of the data cluster, the DAG may determine if the request may be serviced using the accelerator pool using the bidding counters. As discussed above, bidding counters may be numerical representations of the computational, network, and storage resources available for data nodes. The DAG may compare the obtained bidding counter with each other. The bidding counter with the highest numerical representation may be identified as the highest bidding counter. The DAG may identify the data node associated with the highest bidding counter using the data node identifier associated with the bidding counter.

The DAG may check the accelerator pool flag associated with the data node with the highest bidding counter in the metadata mapping repository. If the accelerator pool flags is set, then the data node associated with the highest bidding counter may be in the accelerator pool. If the accelerator pool flag is not set, then the data node may be in the non-accelerator pool. If it is determined that the data nodes associated with the bidding counter is in the accelerator pool, then the DAG may determine that the request may be serviced using the accelerator pool. If it is determined that the data node associated with the highest bidding counter is not in the accelerator pool, then the DAG may determine that the request may not be serviced using the accelerator pool. It may be determined whether the request is able to service the request using the accelerator pool via other and/or additional methods without departing from the invention.

In step 358, the data node of the non-accelerator pool to service the request is identified based on the obtained bidding counters and metadata mappings. In one embodiment of the invention, for requests associated with data previously stored on data nodes of the non-accelerator pool of the data cluster (e.g., read requests, update requests, deletion requests, and information requests) the DAG may use the metadata mappings of the metadata mappings to identify the data node(s) of the non-accelerator pool that include the data required to service the requests. Of the identified data nodes of the non-accelerator pool, the DAG may then identify the data node of the identified data nodes with the highest bidding counter as the identified data node to service the request.

In another embodiment of the invention, for requests that are not associated with data previously stored on the data nodes of the non-accelerator pool (e.g., write requests), the DAG identifies the data node of the non-accelerator pool to service the request using the bidding counters and not the metadata mappings. The DAG may compare the obtained bidding counter with each other. The bidding counter with the highest numerical representation may be identified as the highest bidding counter. The DAG may identify the data node of the non-accelerator pool associated with the highest bidding counter using the data node identifier associated with the bidding counter. The data node of the non-accelerator pool to service the request may be identified based on the obtained bidding counters and metadata mappings via other and/or additional methods without departing from the invention.

In step 360, the request is sent to the identified data node. In one or more embodiments of the invention, the DAG sends a message to the identified data node. The message may include the request obtained from the host. The request may be a copy of the request obtained from the host. The DAG may copy the request in the event that the identified data node is unable to perform the request and the DAG is required to send the request to another data node. The request may be sent to the identified data node via other and/or additional methods without departing from the invention.

The method may end following step 360.

In step 362, the data node of the accelerator pool to service the request is identified based on the obtained bidding counters and metadata mappings. In one embodiment of the invention, for requests associated with data previously stored on data nodes of the accelerator pool of the data cluster (e.g., read requests, update requests, deletion requests, and information requests) the DAG may use the metadata mappings of the metadata mappings to identify the data node(s) of the accelerator pool that include the data required to service the requests. Of the identified data nodes of the accelerator pool, the DAG may then identify the data node of the identified data nodes with the highest bidding counter as the identified data node to service the request.

In another embodiment of the invention, for requests that are not associated with data previously stored on the data nodes of the accelerator pool (e.g., write requests), the DAG identifies the data node of the accelerator pool to service the request using the bidding counters and not the metadata mappings. The DAG may compare the obtained bidding counter with each other. The bidding counter with the highest numerical representation may be identified as the highest bidding counter. The DAG may identify the data node of the accelerator pool associated with the highest bidding counter using the data node identifier associated with the bidding counter. The data node of the accelerator pool to service the request may be identified based on the obtained bidding counters and metadata mappings via other and/or additional methods without departing from the invention.

In step 364, the request is sent to the identified data node. In one or more embodiments of the invention, the DAG sends a message to the identified data node. The message may include the request obtained from the host. The request may be a copy of the request obtained from the host. The DAG may copy the request in the event that the identified data node is unable to perform the request and the DAG is required to send the request to another data node. The request may be sent to the identified data node via other and/or additional methods without departing from the invention.

The method may end following step 364.

FIG. 3F shows a flowchart of a method for determining where in a data cluster to implement data access gateway operations in accordance with one or more embodiments of the invention. The method shown in FIG. 3F may be performed by, for example, a data processor (120, FIG. 1B). Other components of the data clusters (e.g., 110A, 110B) illustrated in FIGS. 1B and 1C may perform the method of FIG. 3F without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 370, a request is obtained from a host. In one or more embodiments of the invention, the host sends a message to the data processor. The message may include a request that is to be processed by data nodes of the data cluster. The request may include data. The request may be obtained from the host via other and/or additional methods without departing from the invention.

In step 372, system metadata is obtained from each data node. In one or more embodiments of the invention, the data processor sends a message to each of the data nodes of the data cluster. The messages may include requests for system metadata from each data node. In response to obtaining the request, the data nodes may generate and/or obtain system metadata system metadata. The system metadata may indicate the computational resources available to the associated data nodes at the time the system metadata was generated. The data nodes may send the system metadata to the data processor. System metadata may be obtained from each data node in a data cluster via other and/or additional methods without departing from the invention.

In step 374, a component(s) is selected to perform DAG operations based on the system metadata. In one or more embodiments of the invention, the data processor uses the obtained system metadata to select the component to perform DAG operations (e.g., execute computer instructions that enable a component to provide the functionality of a DAG). As discussed above, the system metadata may include computational capability information and prior performance information for each component in the system. The computational capability information may indicate whether a component(s) of the data cluster is able to perform DAG operations. The DAG operations may include discovery operations. The prior performance information may be used to determine whether a component(s) performing DAG operations is consuming too many computational resources.

For example, the data processor of the data cluster may check the computational capability information of the system metadata and determine that only two data nodes of the accelerator pool of the data cluster are capable of performing DAG operations. The data processor of the data cluster may then check the prior performance information of the system metadata for the two data nodes and determine that recent past DAG operations performed by the first data nodes included significant latency, harming other operations performed by the first data node. Based on the information included in the system metadata for this scenario, the data processor may then choose to move the DAG operations to the second data node to perform DAG operations.

In step 376, a component(s) is selected to perform bidding counter operations based on the system metadata. In one or more embodiments of the invention, the data processor uses the obtained system metadata to select the component to perform bidding counter operations (e.g., calculating bidding counters and sending bidding counters to the DAG). As discussed above, the system metadata may include computational capability information and prior performance information for each component in the system. The computational capability information may indicate whether a component(s) of the data cluster is able to perform bidding counter operations. The prior performance information may be used to determine whether a component(s) performing bidding counter operations is consuming too many computational resources.

For example, the data processor of the data cluster may check the computational capability information of the system metadata and determine that all data nodes of the of the data cluster are capable of performing bidding counter operations. The data processor of the data cluster may then check the prior performance information of the system metadata for the two data nodes and determine that recent past bidding counter operations performed by the data node did not harm other operations performed by the data nodes in any way. Based on the information included in the system metadata for this scenario, the data processor may then select to perform bidding counter operations on all data nodes of the data cluster.

In step 378, a component(s) is selected to perform metadata mapping operations based on the system metadata. In one or more embodiments of the invention, the data processor uses the obtained system metadata to select the component to perform metadata mapping operations (e.g., generating metadata mappings and sending metadata mappings to the DAG). As discussed above, the system metadata may include computational capability information and prior performance information for each component in the system. The computational capability information may indicate whether a component(s) of the data cluster is able to perform metadata mapping operations. The prior performance information may be used to determine whether a component(s) performing metadata mapping operations is consuming too many computational resources.

For example, the data processor of the data cluster may check the computational capability information of the system metadata and determine that all data nodes of the of the data cluster are capable of performing metadata mapping operations. The data processor of the data cluster may then check the prior performance information of the system metadata for the two data nodes and determine that recent past metadata mapping operations performed by the data node did not harm other operations performed by the data nodes in any way. Based on the information included in the system metadata for this scenario, the data processor may then choose to perform metadata mapping operations on all data nodes of the data cluster.

In step 380, the performance of the operations to service the request is initiated using the selected components. The data processor may send a request to the necessary components of the data cluster involved in the operations and required to service the request from the host. In response to obtaining the request, the selected components and of the data cluster involved in the operations and required to service the request from the host perform the operations and service the request from the host. The performance of the operations to service the request using the selected components may be initiated via other and/or additional methods without departing from the invention.

The method may end following step 380.

Example

The following section describes seven examples. The examples are not intended to limit the invention. The examples are illustrated in FIGS. 4A-4G. Turning to the first example, consider a scenario in which a data processor has selected a data node to perform DAG operations. The DAG operations include discovery operations.

Figure 4A:
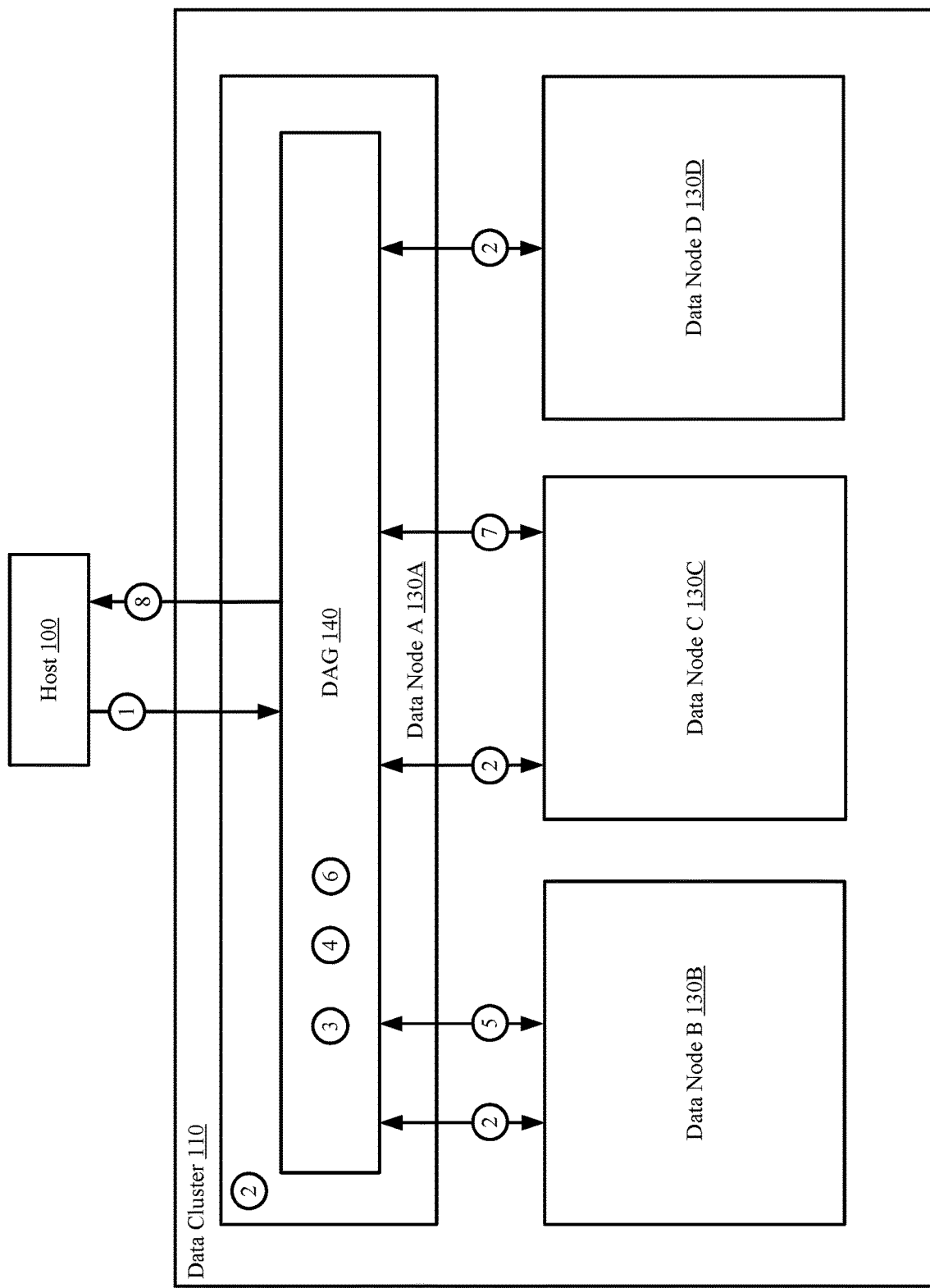
FIG. 4A shows a diagram of a first example in accordance with one or more embodiments of the invention.

FIG. 4A shows a diagram of a first example in accordance with one or more embodiments of the invention. As discussed above, a DAG (140) performing discovery operations is executing on data node A (130) of a data cluster (110). The data cluster (110) may also include data node B (130B), data node C (130C), and data node D (130D). At first point in time, a request is obtained by the DAG (140) from the host (100) [1]. The request is a read request. The DAG (140) then sends a discovery metadata request to each of the data nodes (130A, 130B, 130C, 130D) in the data cluster (110). After obtaining the request, each of the data nodes (130A, 130B, 130C, 130D) generates discovery metadata and then sends the discovery metadata to the DAG (140) [2]. The DAG (140) then updates the discovery metadata repository using the obtained discovery metadata [3]. The DAG (140) then identifies data node B (130B) as a data node that is available to service the request [4]. As a result, the DAG (140) then sends a response to data node B (130B). After obtaining the response, it is determined that data node B (130B) does not include the data associated with the read request and notifies the DAG (140) that it is unable to service the request [5]. As a result, the DAG (140) identifies data node C (130C) as another data node that is available to service the request [6]. The DAG (140) sends the request to data node C (130C). After obtaining the request, data node C (130C) includes the data associated with the read request and services the request. As a result, data node C (130C) sends the data associated with the request to the DAG (140) [7]. The DAG (140) then sends the data associated with the read request to the host (100) [8].

Turning to the second example, consider a scenario in which a data processor has selected a data node to perform DAG operations. The DAG operations include bidding counter operations. The bidding counters are calculated at each data node and sent to the DAG.

Figure 4B:
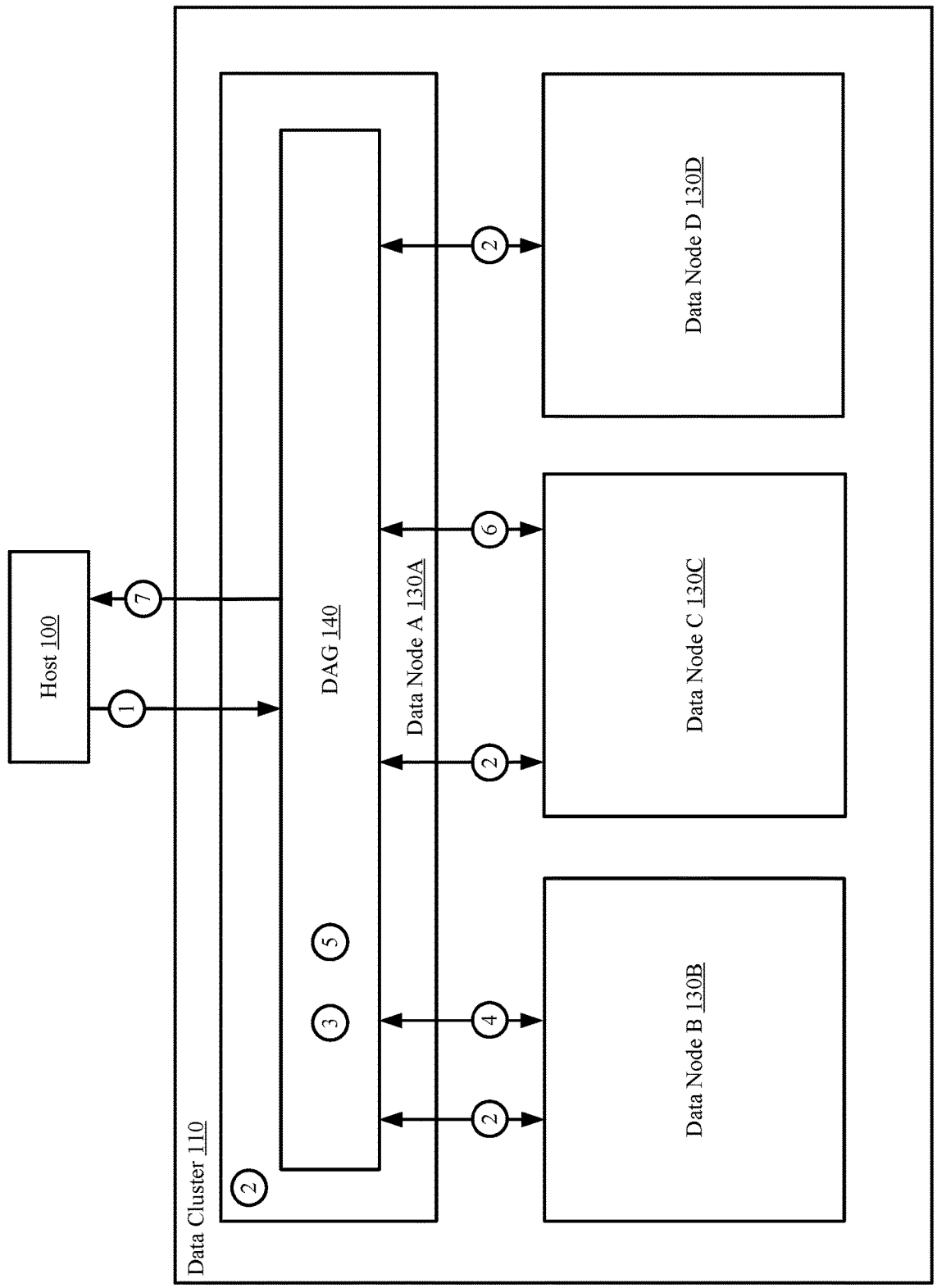
FIG. 4B shows a diagram of a second example in accordance with one or more embodiments of the invention.

FIG. 4B shows a diagram of a second example in accordance with one or more embodiments of the invention. As discussed above, a DAG (140) performing bidding counter operations is executing on data node A (130) of a data cluster (110). The data cluster (110) may also include data node B (130B), data node C (130C), and data node D (130D). At first point in time, a request is obtained by the DAG (140) from the host (100) [1]. The request is a read request. The DAG (140) then sends a bidding counter request to each of the data nodes (130A, 130B, 130C, 130D) in the data cluster (110). After obtaining the request, each of the data nodes (130A, 130B, 130C, 130D) generates bidding counters and then sends the bidding counters to the DAG (140) [2]. The DAG (140) then determines that data node B (130B) is associated with the highest bidding counter [3]. As a result, the DAG (140) then sends the response to data node B (130B). After obtaining the response, it is determined that data node B (130B) does not include the data associated with the read request and notifies the DAG (140) that it is unable to service the request [4]. As a result, the DAG (140) identifies data node C (130C) as the data node with the next highest bidding counter [5]. The DAG (140) then sends the request to data node C (130C). After obtaining the request, data node C (130C) includes the data associated with the read request and services the request. As a result, data node C (130C) sends the data associated with the request to the DAG (140) [6]. The DAG (140) then sends the data associated with the read request to the host (100) [7].

Turning to the third example, consider a scenario in which a data processor has selected a data node to perform DAG operations. The DAG operations include bidding counter operations and metadata mapping operations. The bidding counters and metadata mappings are generated at each data node and sent to the DAG.

Figure 4C:
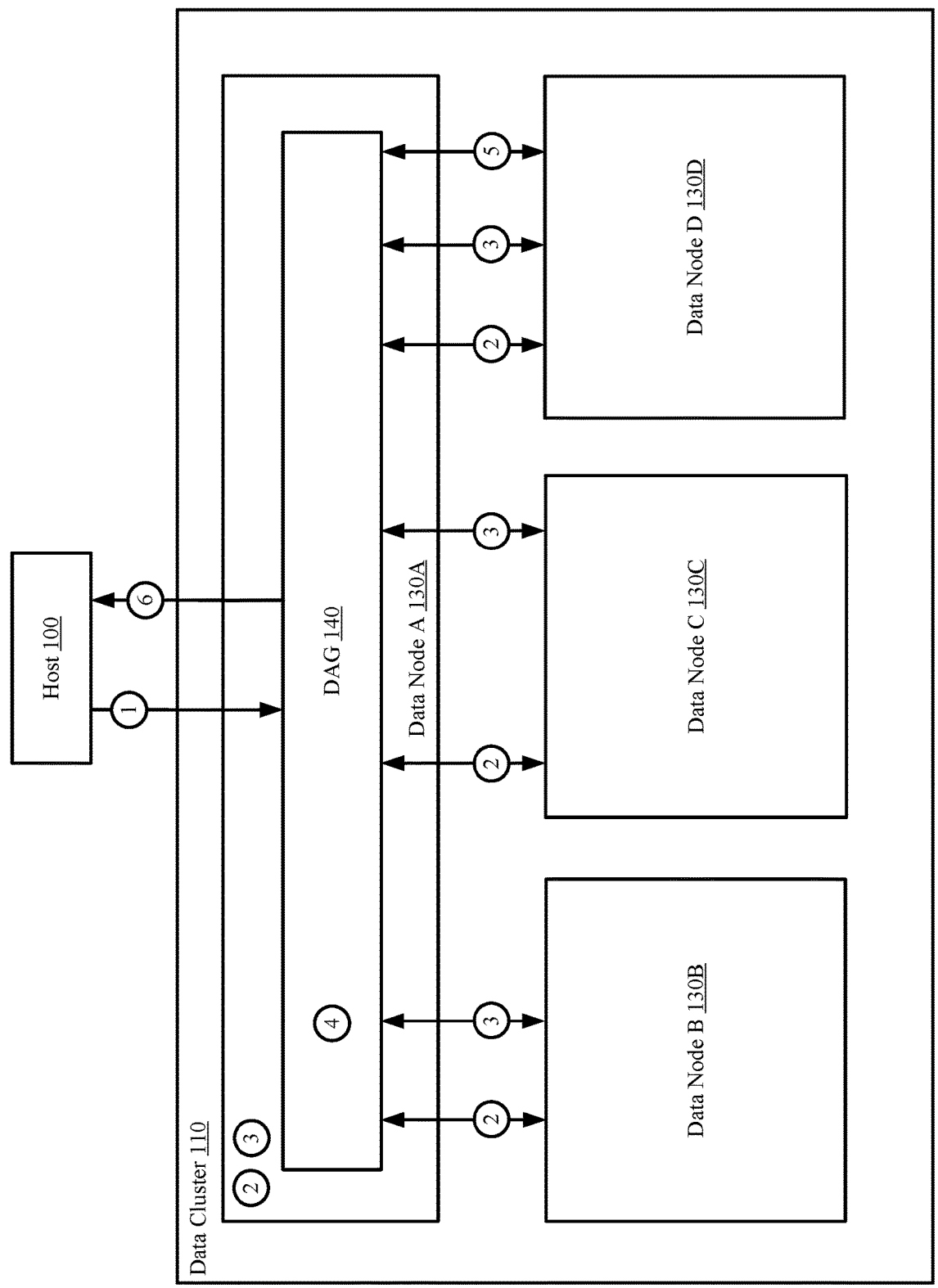
FIG. 4C shows a diagram of a third example in accordance with one or more embodiments of the invention.

FIG. 4C shows a diagram of a third example in accordance with one or more embodiments of the invention. As discussed above, a DAG (140) performing bidding counter operations and metadata mapping operations is executing on data node A (130) of a data cluster (110). The data cluster (110) may also include data node B (130B), data node C (130C), and data node D (130D). At first point in time, a request is obtained by the DAG (140) from the host (100) [1]. The request is a read request. The DAG (140) then sends a bidding counter request to each of the data nodes (130A, 130B, 130C, 130D) in the data cluster (110). After obtaining the request, each of the data nodes (130A, 130B, 130C, 130D) generates bidding counters and then sends the bidding counters to the DAG (140) [2]. The DAG (140) then sends a metadata mapping request to each of the data nodes (130A, 130B, 130C, 130D) in the data cluster (110). After obtaining the request, each of the data nodes (130A, 130B, 130C, 130D) generates metadata mappings and then sends the metadata mappings to the DAG (140) [3].

The DAG (140) then determines that data node B (130B) is associated with the highest bidding counter. However, based on the obtained metadata mappings, data node B (130B) does not include the required data to service the read request. The DAG (140) then identifies data node C (130C) as the data node associated with the highest bidding counter that also includes the data required to service the read request based on the obtained bidding counters and metadata mappings [4]. If the request was a write request, then, in this scenario, the DAG (140) would have sent the request to data node B (130B) as write requests do not need to be serviced by data nodes (e.g., 130A, 130B, 130C) based on previously stored data. Continuing with the discussion of the example in FIG. 4C, the DAG (140) then sends the request to data node C (130C). After obtaining the request, data node C (130C) includes the data associated with the read request and services the request. As a result, data node C (130C) sends the data associated with the request to the DAG (140) [5]. The DAG (140) then sends the data associated with the read request to the host (100) [6].

Turning to the fourth example, consider a scenario in which a data processor has selected a data node to perform DAG operations. The DAG operations include bidding counter operations and metadata mapping operations. The bidding counters and metadata mappings are generated at each data node and sent to the DAG.

Figure 4D:
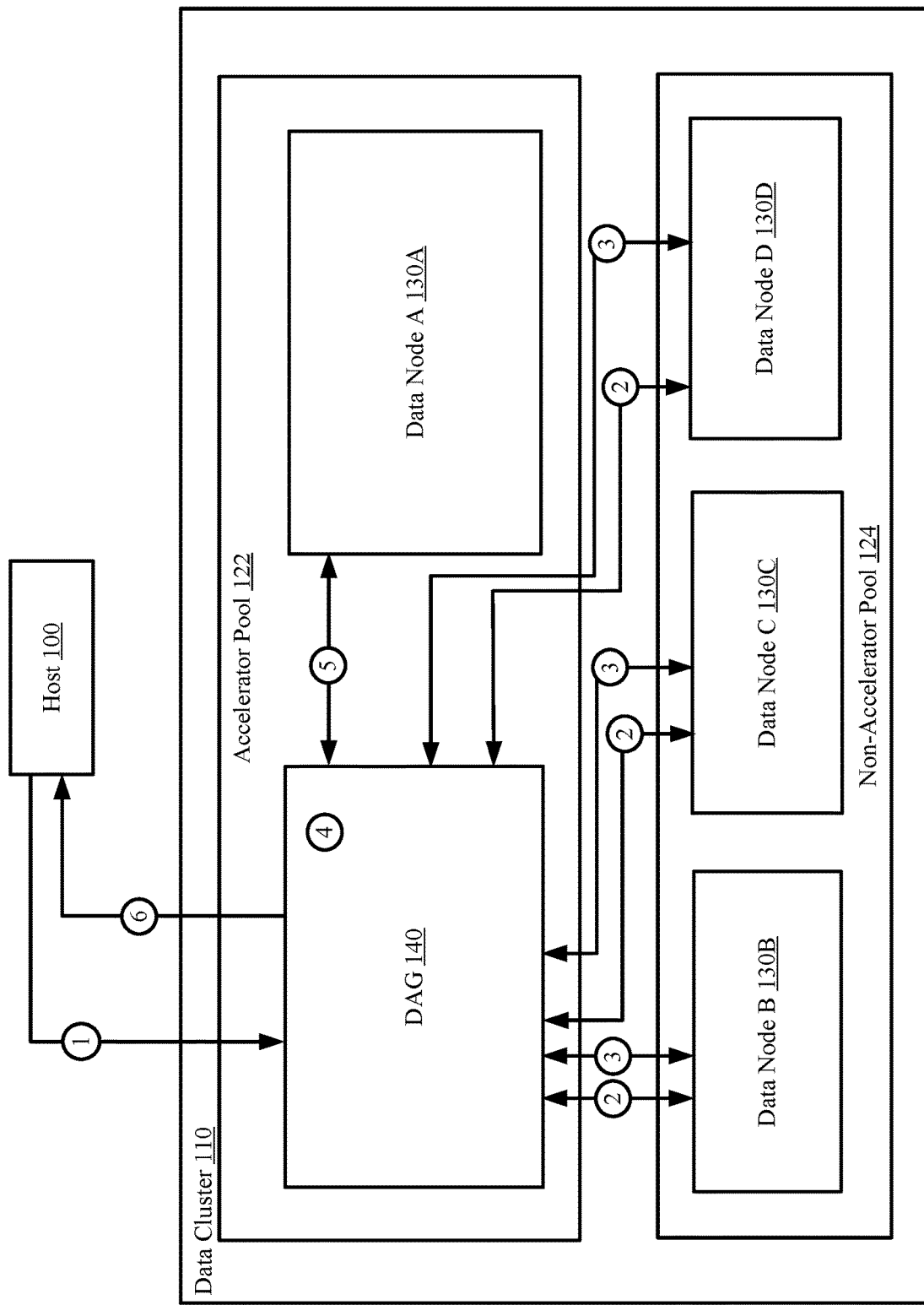
FIG. 4D shows a diagram of a fourth example in accordance with one or more embodiments of the invention.

FIG. 4D shows a diagram of a fourth example in accordance with one or more embodiments of the invention. As discussed above, a DAG (140) performing bidding counter operations and metadata mapping operations is executing on a component (e.g., a high performance processor (not shown)) of an accelerator pool (122) of a data cluster (110). The data cluster (110) may also include data node B (130B), data node C (130C), and data node D (130D) in a non-accelerator pool (124). At first point in time, a request is obtained by the DAG (140) from the host (100) [1]. The request is a read request. The DAG (140) then sends a bidding counter request to each of the data nodes (130A, 130B, 130C, 130D) in the data cluster (110). After obtaining the request, each of the data nodes (130A, 130B, 130C, 130D) generates bidding counters and then sends the bidding counters to the DAG (140) [2]. The DAG (140) then sends a metadata mapping request to each of the data nodes (130A, 130B, 130C, 130D) in the data cluster (110). After obtaining the request, each of the data nodes (130A, 130B, 130C, 130D) generates metadata mappings and then sends the metadata mappings to the DAG (140) [3]. The DAG (140) then determines that data node A (130A) of the accelerator pool (122) is associated with the highest bidding counter and includes the data associated with the read request based on the bidding counters and the metadata mappings [4]. As a result, the DAG (140) then sends the request to data node A (130A). After obtaining the request, data node A (130A) includes the data associated with the read request and services the request. As a result, data node A (130A) sends the data associated with the request to the DAG (140) [5]. The DAG (140) then sends the data associated with the read request to the host (100) [6].

Turning to the fifth example, consider a scenario in which a data processor has selected a data node to perform DAG operations. The DAG operations include bidding counter operations and metadata mapping operations. The bidding counters and metadata mappings are generated at each data node and sent to the DAG.

Figure 4E:
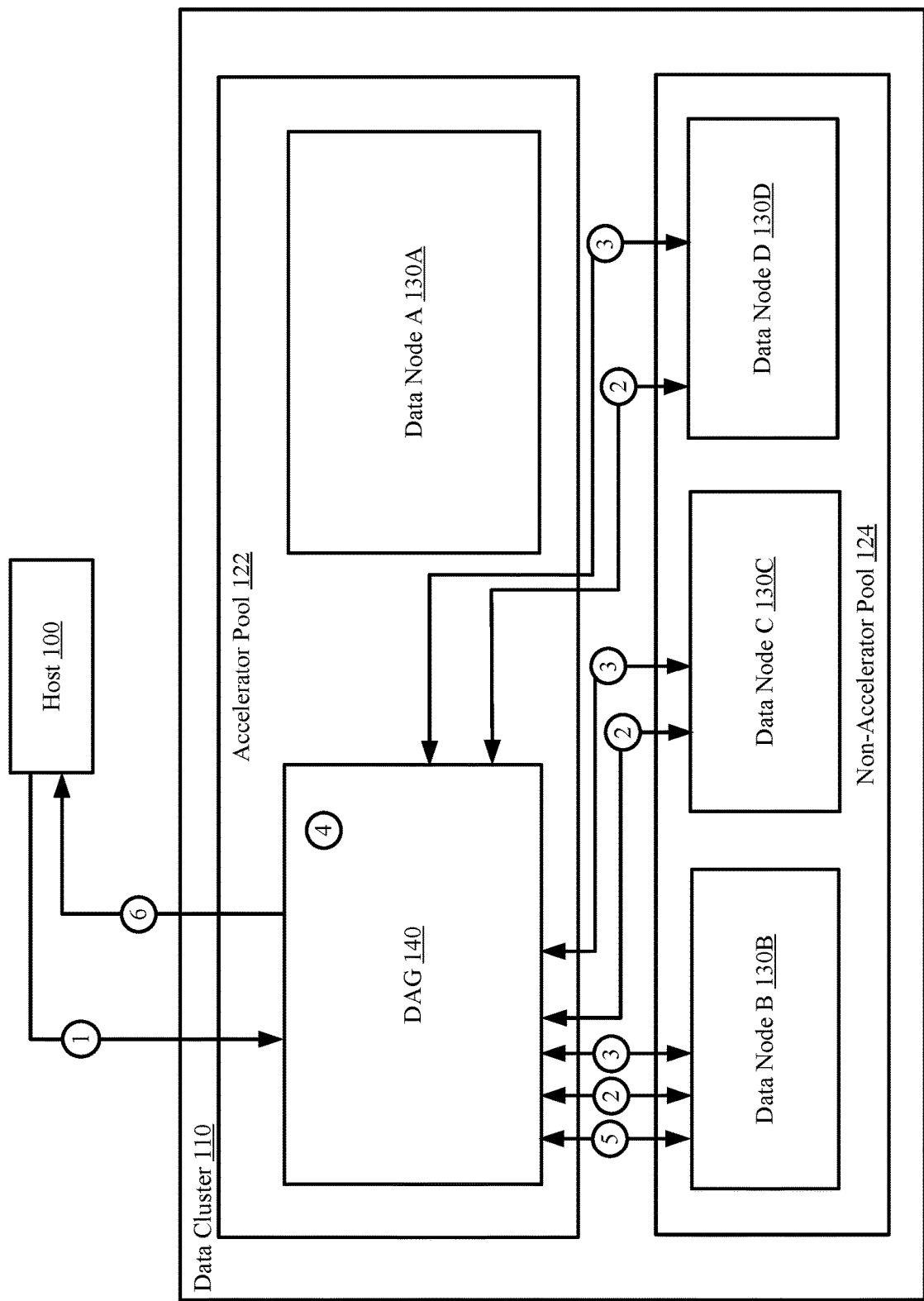
FIG. 4E shows a diagram of a fifth example in accordance with one or more embodiments of the invention.

FIG. 4E shows a diagram of a fifth example in accordance with one or more embodiments of the invention. As discussed above, a DAG (140) performing bidding counter operations and metadata mapping operations is executing on a component (e.g., a high performance processor (not shown)) of an accelerator pool (122) of a data cluster (110). The data cluster (110) may also include data node B (130B), data node C (130C), and data node D (130D) in a non-accelerator pool (124). At first point in time, a request is obtained by the DAG (140) from the host (100) [1]. The request is a read request. The DAG (140) then sends a bidding counter request to each of the data nodes (130A, 130B, 130C, 130D) in the data cluster (110). After obtaining the request, each of the data nodes (130A, 130B, 130C, 130D) generates bidding counters and then sends the bidding counters to the DAG (140) [2]. The DAG (140) then sends a metadata mapping request to each of the data nodes (130A, 130B, 130C, 130D) in the data cluster (110). After obtaining the request, each of the data nodes (130A, 130B, 130C, 130D) generates metadata mappings and then sends the metadata mappings to the DAG (140) [3]. The DAG (140) then determines that data node B (130AB) of the non-accelerator pool (124) is associated with the highest bidding counter and includes the data associated with the read request based on the bidding counters and the metadata mappings [4]. As a result, the DAG (140) then sends the request to data node B (130B). After obtaining the request, data node B (130B) includes the data associated with the read request and services the request. As a result, data node B (130B) sends the data associated with the request to the DAG (140) [5]. The DAG (140) then sends the data associated with the read request to the host (100) [6].

Turning to the sixth example, consider a scenario in which a data processor is determining where to perform DAG operations in a data cluster.

Figure 4F:
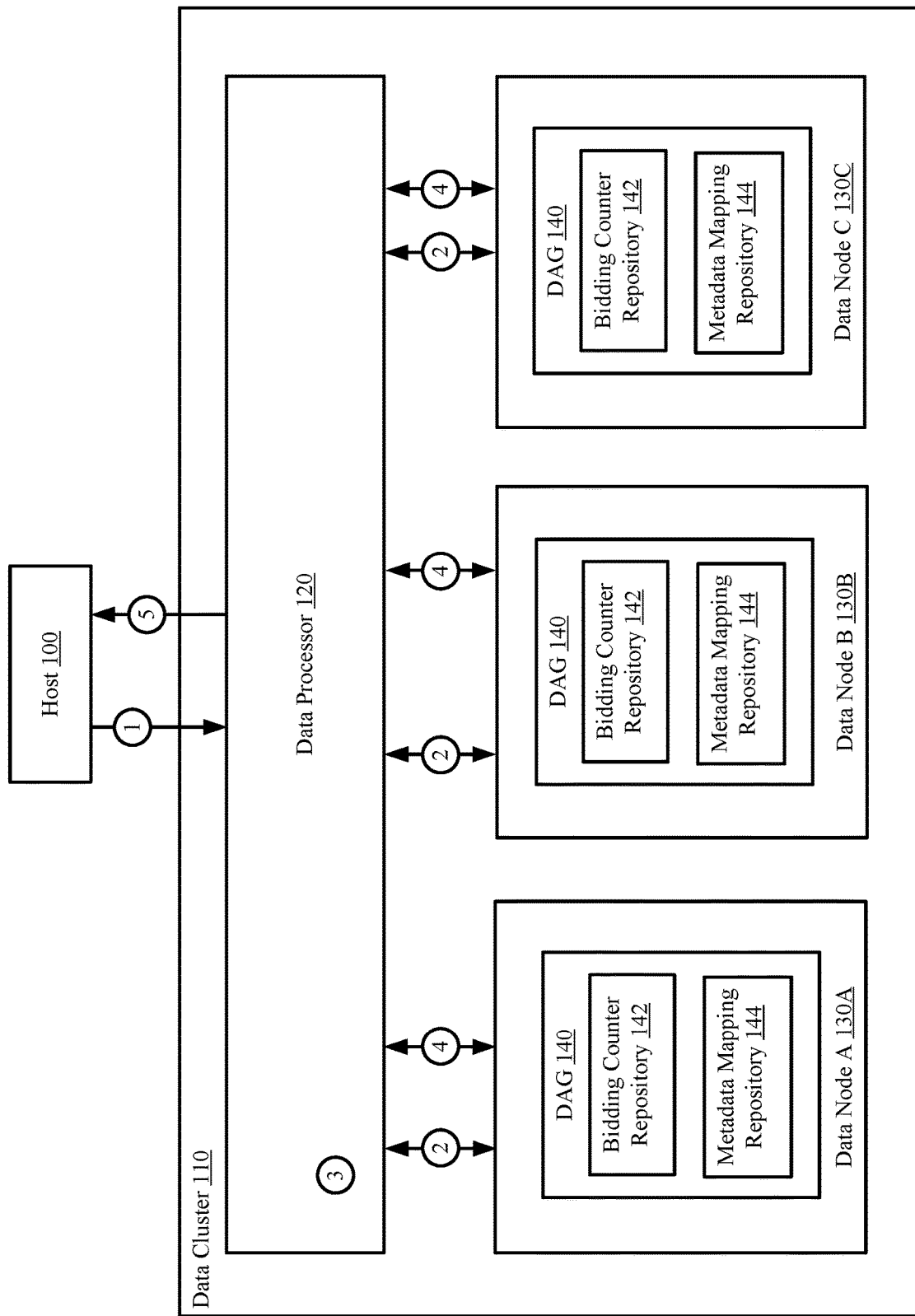
FIG. 4F shows a diagram of a sixth example in accordance with one or more embodiments of the invention.

FIG. 4F shows a diagram of a sixth example in accordance with one or more embodiments of the invention. At first point in time, a request is obtained by a data processor (120) from the host (100) [1]. The request is a read request. The data processor (120) then sends a system metadata request to each of the data nodes (130A, 130B, 130C) in the data cluster (110). After obtaining the request, each of the data nodes (130A, 130B, 130C) generates system metadata and then sends the system metadata to the data processor (120) [2]. The data processor (120) then selects each data node (130A, 130B, 130C) to execute a DAG (140) that performs DAG operations, to perform bidding counter operations and maintain a bidding counter repository (142), and to perform metadata mapping operations and maintain a metadata mapping repository (144) [3]. The data processor then sends a request to the data nodes (130A, 130B, 130C) initiating the servicing of the request and the performance of the operations at the selected data nodes. After obtaining the requests, the operations are performed by the selected data nodes and the request is serviced, resulting in data node A (130A) sending the data associated with the read request to the data processor (120) [4]. The data processor (120) then sends the data associated with the read request to the host (100) [5].

Turning to the seventh example, consider a scenario in which a data processor is determining where to perform DAG operations in a data cluster.

Figure 4G:
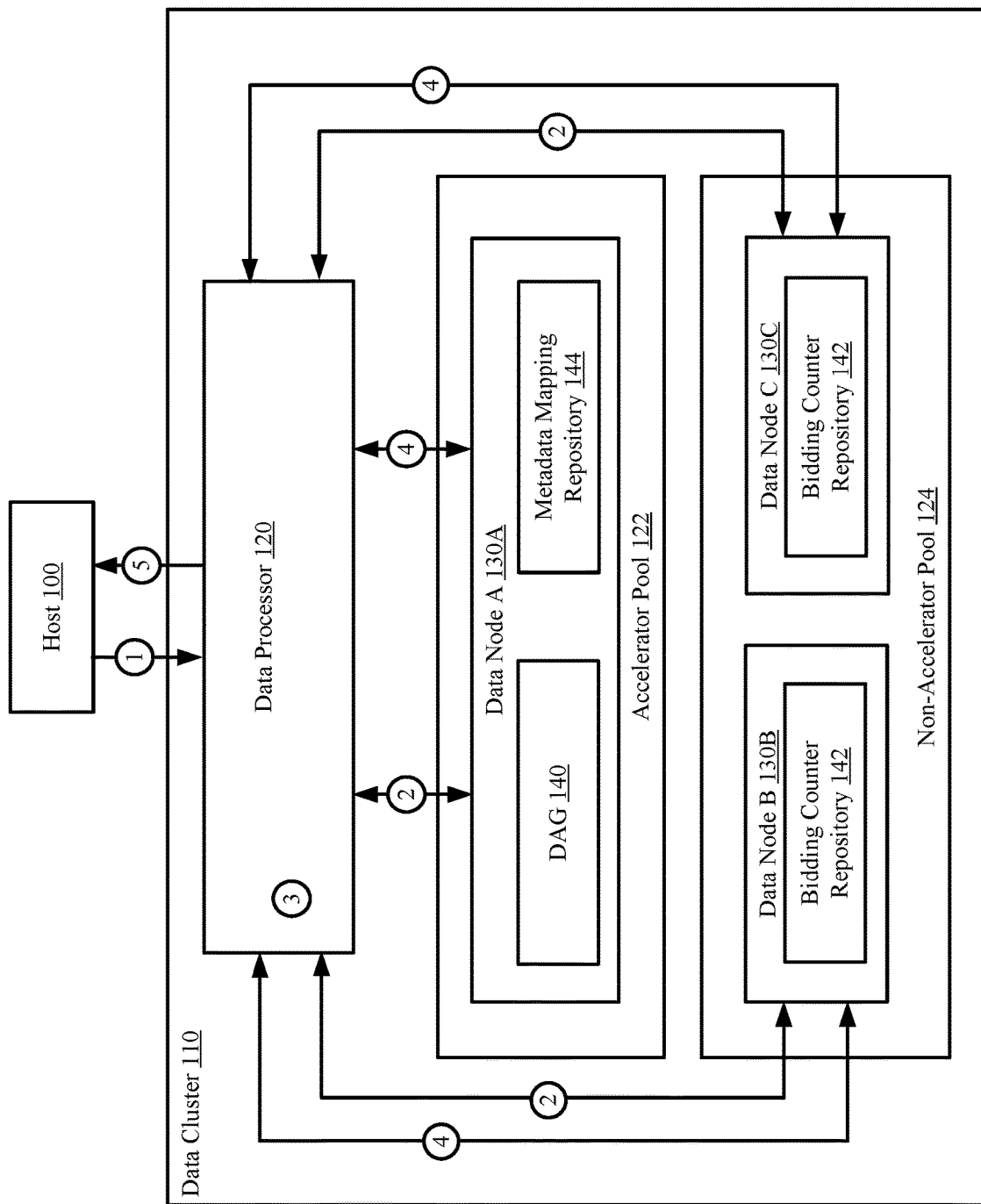
FIG. 4G shows a diagram of a seventh example in accordance with one or more embodiments of the invention.

FIG. 4G shows a diagram of a seventh example in accordance with one or more embodiments of the invention. At first point in time, a request is obtained by a data processor (120) from the host (100) [1]. The request is a read request. The data processor (120) then sends a system metadata request to data node A (130A) of the accelerator pool (122) of the data cluster (110) and each of the data nodes (130B, 130C) in non-accelerator pool (124) of the data cluster (110). After obtaining the request, each of the data nodes (130A, 130B, 130C) generates system metadata and then sends the system metadata to the data processor (120) [2]. The data processor (120) then selects data node A (130A) of the accelerator pool (120) to execute a DAG (140) that performs DAG operations, and to perform metadata mapping operations and maintain a metadata mapping repository (144). The data processor also selects data node B (130B) and data node C (130C) of the non-accelerator pool (124) to perform bidding counter operations and maintain a bidding counter repository (142) [3]. The data processor then sends a request to the data nodes (130A, 130B, 130C) initiating the servicing of the request and the performance of the operations at the selected data nodes. After obtaining the requests, the operations are performed by the selected data nodes and the request is serviced, resulting in data node A (130A) sending the data associated with the read request to the data processor (120) [4]. The data processor (120) then sends the data associated with the read request to the host (100) [5].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to identifying data nodes of a system that are available to service requests through data access gateway (DAG) operations. The DAG operations may include identifying, based on obtained bidding counters and metadata mappings that specify the amount of computational resources available to the data nodes and the data stored in the data nodes of the data cluster respectively, available data nodes that include the required data to service requests, determining whether the data nodes are in an accelerator pool of the data cluster as data nodes within the accelerator pool include higher computational capabilities than those in a non-accelerator pool, and selecting the identified data nodes associated with the highest bidding counter to service the requests. The DAG operations and the use of bidding counters and metadata mappings may be used to improve the computational efficiency of accessing data stored in a data cluster.

In traditional systems, the host must identify or randomly select data nodes of a data cluster to services requests. This may take up computational resources of the host, thereby harming other computational operations performed by the host. Embodiments of the invention improve the computational efficiency of accessing data stored in a data cluster by the performance of DAG operations by a DAG using bidding counters and metadata mappings.

Thus, embodiments of the invention may address the problem of inefficient use of computing resources to access data in a data cluster. This problem arises due to the technological nature of the environment in which the data of the data cluster is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for accessing data nodes of a data cluster, the method comprising:
    obtaining, by a data access gateway (DAG), a first request from a host; and
    in response to the first request:
        obtaining first bidding counters from the data nodes;
        obtaining first metadata mappings from the data nodes, wherein the first metadata mappings comprise accelerator pool flags and specify data chunks and parity chunks stored on the data nodes;
        making a first determination that the first request may not be served using any data node in an accelerator pool of the data cluster based on the accelerator pool flags of the first metadata mappings; and
        in response to the first determination:
            identifying, based on the first bidding counters and the first metadata mappings, a data node in a non-accelerator pool of the data cluster associated with a first highest bidding counter of the bidding counters and a first appropriate metadata mapping of the metadata mappings; and
            sending the first request to the data node in the non-accelerator pool of the data cluster.

2. The method of claim 1, the method further comprising:
    obtaining, by the DAG, a second request from a host; and
    in response to the second request:
        obtaining second bidding counters from the data nodes;
        obtaining second metadata mappings from the data nodes;
        making a second determination that the second request may be serviced using the accelerator pool of the data cluster; and
        in response to the second determination:
            identifying, based on the bidding counters and metadata mappings, a data node in the accelerator pool associated with at least highest bidding counter of the second bidding counters and an appropriate metadata mapping of the second metadata mappings; and
            sending the second request to the data node in the accelerator pool.

3. The method of claim 1, wherein the bidding counters specify an amount computational resources of the data nodes available to serve the first request.

4. The method of claim 1, wherein the first request is one selected from a group consisting of:
    a read request;
    a write request;
    an update request;
    an information request; and
    a delete request.

5. The method of claim 1, the method further comprising:
    prior to obtaining the first request:
        obtaining, by a data processor, system metadata from the data nodes of the data nodes;
        selecting, based on the system metadata, a second data node of the data nodes included in the accelerator pool to perform DAG operations;
        selecting, based on the system metadata, the data nodes of the data nodes included in the non-accelerator pool to perform bidding counter operations;
        selecting, based on the system metadata, the data nodes of the data nodes included in the non-accelerator pool to perform metadata mapping operations; and
        initiating the performance of:
            DAG operations on the second data node of the data nodes included in the accelerator pool,
            the bidding counter operations on the data nodes of the data nodes in the non-accelerator pool, and
            the metadata mapping operation on the data nodes of the data nodes included in the non-accelerator pool.

6. The method of claim 5, wherein the system metadata specifies computational resources available to the data nodes of the data nodes.

7. A system for accessing data nodes of a data cluster, comprising:
    a processor;
    a data access gateway (DAG), which when executed by the processor performs a method,
    the method comprising:
    obtaining, by the DAG, a first request from a host; and
    in response to the first request:
        obtaining first bidding counters from the data nodes;
        obtaining first metadata mappings from the data nodes, wherein the first metadata mappings comprise accelerator pool flags and specify data chunks and parity chunks stored on the data nodes;
        making a first determination that the first request may not be served using any data node in an accelerator pool of the data cluster based on the accelerator pool flags of the first metadata mappings; and
        in response to the first determination:
            identifying, based on the bidding counters and metadata mappings, a data node in a non-accelerator pool of the data cluster associated with a first highest bidding counter of the bidding counters and a first appropriate metadata mapping of the metadata mappings; and
            sending the first request to the data node in the non-accelerator pool of the data cluster.

8. The system of claim 7, wherein the method further comprising:
    obtaining, by the DAG, a second request from a host; and
    in response to the second request:
        obtaining second bidding counters from the data nodes;
        obtaining second metadata mappings from the data nodes;
        making a second determination that the second request may be serviced using the accelerator pool of the data cluster; and in response to the second determination:
: identifying, based on the bidding counters and metadata mappings, a data node in the accelerator pool associated with at least highest bidding counter of the second bidding counters and an appropriate metadata mapping of the second metadata mappings; and
: sending the second request to the data node in the accelerator pool.

9. The system of claim 7, wherein the bidding counters specify an amount computational resources of the data nodes available to serve the first request.

10. The system of claim 7, wherein the first request is one selected from a group consisting of:
: a read request;
: a write request;
: an update request;
: an information request; and
: a delete request.

11. The system of claim 7, the method further comprising:
: prior to obtaining the first request:
: : obtaining, by a data processor, system metadata from the data nodes of the data nodes;
: : selecting, based on the system metadata, a second data node of the data nodes included in the accelerator pool to perform DAG operations;
: : selecting, based on the system metadata, the data nodes of the data nodes included in the non-accelerator pool to perform bidding counter operations;
: : selecting, based on the system metadata, the data nodes of the data nodes included in the non-accelerator pool to perform metadata mapping operations; and
: : initiating the performance of:
: : : DAG operations on the second data node of the data nodes included in the accelerator pool,
: : : the bidding counter operations on the data nodes of the data nodes in the non-accelerator pool, and
: : : the metadata mapping operation on the data nodes of the data nodes included in the non-accelerator pool.

12. The system of claim 11, wherein the system metadata specifies computational resources available to the data nodes of the data nodes.

13. A non-transitory computer readable medium comprising computer readable program code, which when executed by a computer processor enables the computer processor to perform a method for accessing data nodes of a data cluster, the method comprising:
: obtaining, by a data access gateway (DAG), a first request from a host; and
: in response to the first request:
: : obtaining first bidding counters from the data nodes;
: : obtaining first metadata mappings from the data nodes, wherein the first metadata mappings comprise accelerator pool flags and specify data chunks and parity chunks stored on the data nodes;
: : making a first determination that the first request may not be served using any data node in an accelerator pool of the data cluster based on the accelerator pool flags of the first metadata mappings; and
: : in response to the first determination:
: : : identifying, based on the bidding counters and metadata mappings, a data node in a non-accelerator pool of the data cluster associated with a first highest bidding counter of the bidding counters and a first appropriate metadata mapping of the metadata mappings; and
: : : sending the first request to the data node in the non-accelerator pool of the data cluster.

14. The non-transitory computer readable medium of claim 13, wherein the method further comprising:
: obtaining, by the DAG, a second request from a host; and
: in response to the second request:
: : obtaining second bidding counters from the data nodes;
: : obtaining second metadata mappings from the data nodes;
: : making a second determination that the second request may be serviced using the accelerator pool of the data cluster; and
: : in response to the second determination:
: : : identifying, based on the bidding counters and metadata mappings, a data node in the accelerator pool associated with at least highest bidding counter of the second bidding counters and an appropriate metadata mapping of the second metadata mappings; and
: : : sending the second request to the data node in the accelerator pool.

15. The non-transitory computer readable medium of claim 13, wherein the bidding counters specify an amount computational resources of the data nodes of the data nodes available to serve the first request.

16. The non-transitory computer readable medium of claim 13, wherein the first request is one selected from a group consisting of:
: a read request;
: a write request;
: an update request;
: an information request; and
: a delete request.

17. The non-transitory computer readable medium of claim 13, the method further comprising:
: prior to obtaining the first request:
: : obtaining, by a data processor, system metadata from the data nodes of the data nodes;
: : selecting, based on the system metadata, a second data node of the data nodes included in the accelerator pool to perform DAG operations;
: : selecting, based on the system metadata, the data nodes of the data nodes included in the non-accelerator pool to perform bidding counter operations;
: : selecting, based on the system metadata, the data nodes of the data nodes included in the non-accelerator pool to perform metadata mapping operations; and
: : initiating the performance of:
: : : DAG operations on the second data node of the data nodes included in the accelerator pool,
: : : the bidding counter operations on the data nodes of the data nodes in the non-accelerator pool, and
: : : the metadata mapping operation on the data nodes of the data nodes included in the non-accelerator pool.

\* \* \* \* \*